(12) United States Patent
Hartley et al.

(10) Patent No.: US 10,728,106 B1
(45) Date of Patent: Jul. 28, 2020

(54) MULTI-DOMAIN CLOUD COMPUTING

(71) Applicant: Architecture Technology Corporation, Minneapolis, MN (US)

(72) Inventors: Timothy E. Hartley, Eden Prairie, MN (US); Ranga S. Ramanujan, Medina, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 153 days.

(21) Appl. No.: 15/583,711

(22) Filed: May 1, 2017

Related U.S. Application Data

(60) Provisional application No. 62/329,429, filed on Apr. 29, 2016.

(51) Int. Cl.
| | |
|---|---|
| *H04L 12/24* | (2006.01) |
| *H04L 29/08* | (2006.01) |
| *H04L 12/46* | (2006.01) |
| *H04L 12/741* | (2013.01) |
| *H04L 29/06* | (2006.01) |
| *G06F 9/455* | (2018.01) |

(52) U.S. Cl.
CPC .......... *H04L 41/20* (2013.01); *G06F 9/45558* (2013.01); *H04L 12/4641* (2013.01); *H04L 45/74* (2013.01); *H04L 63/0428* (2013.01); *H04L 67/10* (2013.01); *G06F 2009/45579* (2013.01)

(58) Field of Classification Search
CPC . H04L 41/20; H04L 63/0428; H04L 12/4641; H04L 67/10; H04L 45/74; G06F 9/45558; G06F 2009/45579
See application file for complete search history.

(56) References Cited

U.S. PATENT DOCUMENTS

| | | | |
|---|---|---|---|
| 8,706,798 B1 | 4/2014 | Suchter et al. | |
| 8,812,627 B2* | 8/2014 | Donahue | G06F 9/5072 709/220 |
| 8,838,733 B2* | 9/2014 | Speckbacher | H04L 29/12066 709/217 |
| 9,292,060 B1* | 3/2016 | Marr | G06F 1/3203 |
| (Continued) | | | |

OTHER PUBLICATIONS

"Apache CloudStack", Apache Software Foundation, Access from the Internet: https://cloudstack.apache.org/ on May 2, 2017, pp. 1-5.

(Continued)

*Primary Examiner* — Lynn D Feild
*Assistant Examiner* — Abdullah Almamun
(74) *Attorney, Agent, or Firm* — Carlson, Caspers, Vandenburgh & Lindquist, P.A.

(57) ABSTRACT

A method of managing a plurality of client nodes in a network is disclosed. A plurality of domains is provided in the network, each domain isolating data from other domains. A plurality of applications is also provided, each application of the plurality of applications allowed to operate in one or more of the plurality of domains. Each of the plurality of client nodes is allowed to operate in one or more of the plurality of domains. The method includes assigning the plurality of applications to the plurality of client nodes, such that each application of the plurality of applications is assigned to a client node that is allowed to operate in a domain that the application is allowed to operate in.

20 Claims, 11 Drawing Sheets

(56) References Cited

U.S. PATENT DOCUMENTS

| | | | |
|---|---|---|---|
| 9,292,317 B2* | 3/2016 | Chen | G06F 9/455 |
| 9,792,103 B2* | 10/2017 | Govindaraju | G06F 8/61 |
| 2005/0114861 A1 | 5/2005 | Mitchell | |
| 2006/0034297 A1* | 2/2006 | O'Neill | H04L 63/1408 370/395.53 |
| 2006/0155630 A1* | 7/2006 | Sonnleithner | G06Q 10/0631 705/35 |
| 2009/0307703 A1 | 12/2009 | Archer et al. | |
| 2011/0231899 A1* | 9/2011 | Pulier | G06F 9/45558 726/1 |
| 2014/0207505 A1* | 7/2014 | Ashley | G06Q 10/063112 705/7.14 |
| 2015/0006726 A1* | 1/2015 | Yuan | H04L 47/70 709/225 |
| 2015/0058459 A1* | 2/2015 | Amendjian | H04L 41/5058 709/223 |
| 2015/0134823 A1 | 5/2015 | Cucinotta et al. | |
| 2015/0372883 A1* | 12/2015 | Lam | H04L 41/0893 709/226 |
| 2015/0381578 A1* | 12/2015 | Thota | G09C 1/00 713/168 |
| 2016/0019069 A1 | 1/2016 | Wei et al. | |
| 2016/0147550 A1* | 5/2016 | McWilliams | G06F 21/121 718/1 |
| 2016/0197880 A1* | 7/2016 | Korman | H04L 41/12 709/226 |
| 2017/0250977 A1* | 8/2017 | Turner | H04L 67/30 |
| 2018/0060128 A1 | 3/2018 | Liu et al. | |

OTHER PUBLICATIONS

"Citrix Common Criteria Certification Information", Citrix, Accessed from the Internet: https://www.citrix.com/about/legal/security-compliance/common-criteria.html on May 2, 2017, pp. 1-3.

"Emulab—Network, Emulation Testbed Home", Emulab, Access from the Internet: https://www.emulab.net/ on May 2, 2017, pp. 1-2.

"Red Hat and IBM Achieve Top Security Certification for KVM Hypervisor on Red Hat Enterprise Linux and IBM Servers", Red Hat, Inc., May 9, 2012, pp. 1-3.

"The Common Criteria", Accessed from the Internet: http://www.commoncriteriaportal.org on May 2, 2017, pp. 1-2.

"The Hypervisor (x86 & ARM)", Linux Foundation, Accessed from the Internet: https://www.xenproject.org/developers/teams/hypervisor.html on May 2, 2017, pp. 1-3.

"What is OpenStack?", Openstack, Accessed from the Internet: https://www.openstack.org/software/ on May 2, 2017, pp. 1-3.

"U.S. Government Protection Profile for Separation Kernels in Environments Requiring High Robustness Version 1.03", Information Assurance Directorate, Jun. 29, 2007, pp. 1-182.

U.S. Patent and Trademark Office, "Final Office Action", U.S. Appl. No. 15/583,692, dated May 30, 2019, pp. 1-17.

U.S. Patent and Trademark Office, "Notice of Allowance", U.S. Appl. No. 15/583,692, dated Oct. 15, 2019, pp. 1-8.

U.S. Patent and Trademark Office, "Office Action", U.S. Appl. No. 15/583,692, dated Dec. 12, 2018, pp. 1-14.

* cited by examiner

Profile of App #1 — 400

| Aspect | Value |
|---|---|
| Priority Level | 2 |
| Miniumum Hardware | Processor w/ 2 GB RAM |
| Miniumum Time | 1 hr. |
| Desired Hardware | DSP |
| Authorized Domains | 1 |
| Measured Hardware | 3 GB RAM Avg. |

402 encompasses Priority Level through Authorized Domains; 404 indicates Measured Hardware.

Profile of App #2 — 401

| Aspect | Value |
|---|---|
| Priority Level | 3 |
| Miniumum Hardware | GPU |
| Miniumum Time | 20 min. |
| Desired Hardware | None |
| Authorized Domains | 1, 2 |
| Measured Hardware | 30 min. Execution Time Avg. |

FIG. 4

| | App | App #1 | App #2 | App #1 | App #1 |
|---|---|---|---|---|---|
| 802 | | | | | |
| 804 | Trigger Event | 12:00 PM GMT | 1 Hour After Mgmt. Session Initiation | Receive Info: re: Car Detected | Receive Info: Car Detected & Receive info: Less than 50% Battery |
| 806 | Action | Add to Authorized List & Set Priority at #1 | Add to Authorized List | Set Priority at #2 | Remove from Authorized List |

MULTI-DOMAIN CLOUD COMPUTING

RELATED APPLICATION

This application claims priority to U.S. Provisional Patent Application No. 62/329,429, filed on Apr. 29, 2016, entitled "SOFTWARE CLOUD MANAGEMENT", which is hereby incorporated herein by reference.

GOVERNMENT CONTRACT

This invention was made with government support under contract FA8650-14-M-1764 awarded by the United States Air Force. The government may have certain rights in the invention.

BACKGROUND

Cloud computing management software offers central control of multiple applications across multiple client nodes. Most existing cloud management software is configured for use in a cloud network that includes general purpose client nodes, wherein each client node has similar processing and data storage capabilities. Additionally, some cloud management solutions require the hardware on client nodes to support specific features. These make existing cloud management software difficult to integrate into pre-existing computing systems with diverse hardware resources that were not originally intended for cloud computing.

Existing cloud management software is also configured for use in environments with unlimited or elastic hardware resources. For example, many cloud management solutions operate in environments where if additional hardware resources are needed, the additional resources can be obtained by renting them from available hardware resource "farms" on the internet. Because of this, many cloud management solutions rigidly assign hardware resources to applications, such that once a hardware resource is assigned to an application it cannot be reassigned or shared with another application until the first application has completed. This leads to wasted hardware resources, as a hardware resource that is idle or underutilized by an application cannot be reassigned or shared with another application until the assigned application is complete. This is undesirable in some situation, such as when only a small amount of fixed hardware resources is available.

Additionally, existing cloud management software is not configured to implement, within its managed cloud, multiple domains, which are segregated such that an application in one domain cannot concurrently share a hardware resource with an application in another domain. As such, existing cloud management software may not sufficiently segregate applications to allow different security level applications to be implemented within the same managed cloud.

BRIEF DESCRIPTION

Embodiments for a method of managing a plurality of client nodes in a network. A plurality of domains is provided in the network, each domain isolating data from other domains. A plurality of applications is also provided, each application of the plurality of applications allowed to operate in one or more of the plurality of domains. Each of the plurality of client nodes is allowed to operate in one or more of the plurality of domains. The method includes assigning the plurality of applications to the plurality of client nodes, such that each application of the plurality of applications is assigned to a client node that is allowed to operate in a domain that the application is allowed to operate in.

Embodiments for a network of nodes is also provided. The network includes a plurality of client nodes, and one or more networking devices. The plurality of client nodes and networking devices implement multiple domains, each domain of the multiple domains isolating data from other domains of the multiple domains. A cloud manager instructs the plurality of client nodes to run a plurality of applications, such that an allowed domain for each of the plurality of applications matches with an allowed domain of a client node on which the application is run.

Embodiments for a data storage entity are also provided. The data storage entity comprises a processor readable medium having software stored thereon. The software, when executed by one or more processing devices assigns a plurality of applications to a plurality of client nodes, such that each application of the plurality of applications is assigned to a client node that is allowed to operate in a domain that the application is allowed to operate in. Each domain of the plurality of domains is a distinct one or more local area networks, wherein each domain isolates data from other domains. Each application of the plurality of applications is allowed to operate in one or more of the plurality of domains, and each of the plurality of client nodes is allowed to operate in one or more of the plurality of domains.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 is two tables illustrating two example profiles of two different applications available to be assigned by the cloud manager of the network of FIG. 1;

FIG. 8 is a table illustrating an example plan that can be implemented by the cloud manager of the network of FIG. 1;

DETAILED DESCRIPTION

Figure 1:
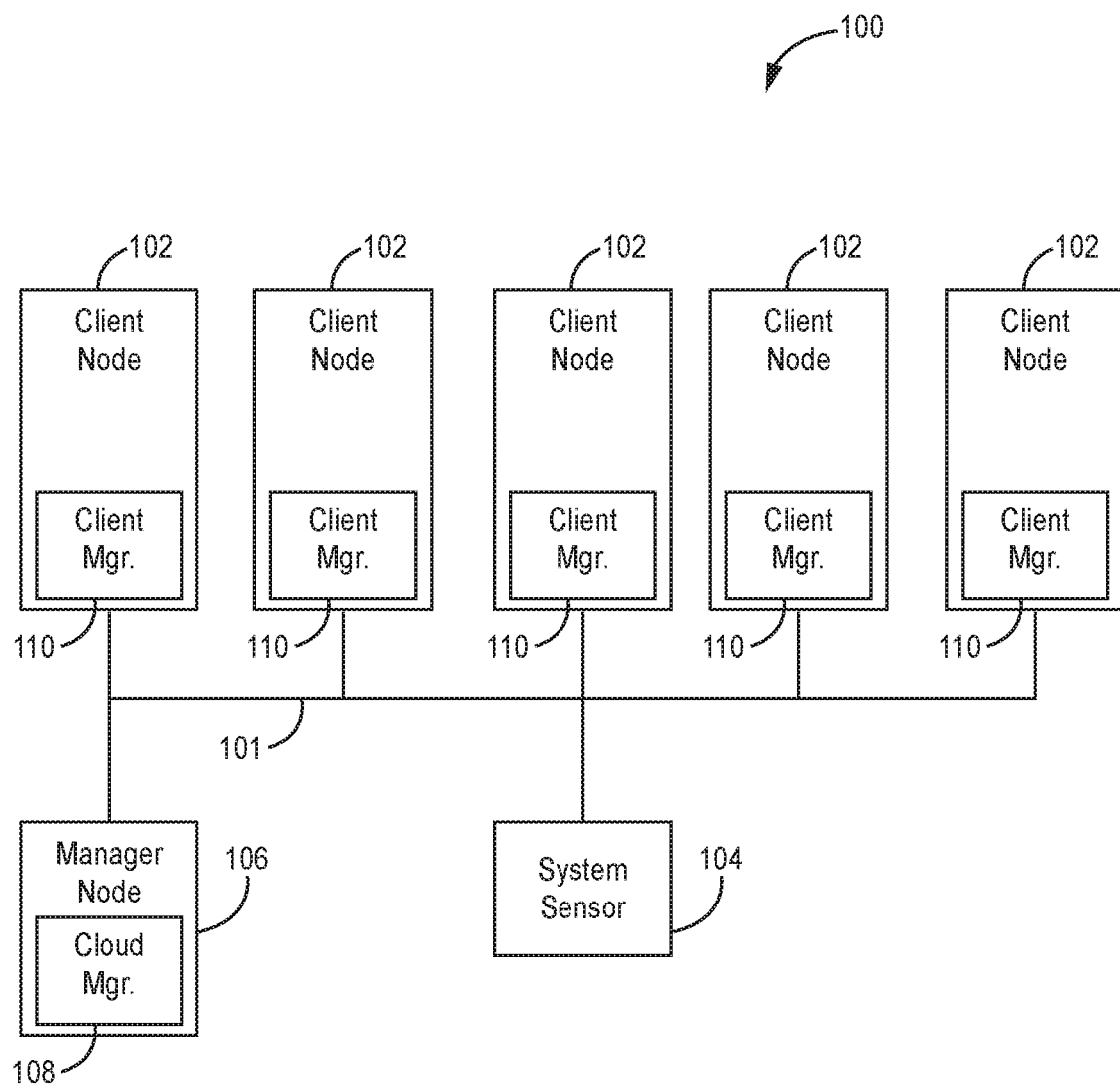
FIG. 1 is a block diagram of an example network including a plurality of nodes that can implement multi-domain cloud computing.

FIG. 1 is a block diagram of an example network 100 including a plurality of nodes 102, 104, 106 communicatively coupled together via one or more network links 101. Each network link 101 of the network 100 can be a physical link implemented over one or more physical communication media (e.g., an Ethernet cable such as a cat-5E compliant cable) or can be a wireless link implemented using wireless signals. Additionally, one or more networking devices (not shown), such as a bridge, a hub, or a switch can be included in the network 100 to communicatively couple the nodes 102, 104, 106 together. For simplicity, single lines are shown connecting the nodes 102, 104, 106 together, however, one or more distinct network links 101 communicatively coupling each of the nodes 102, 104, 106 to a networking device or another node can be used as described below in the example portions 300, 500, 600, and 700 of network 100. Nodes 102, 104, 106 of network 100 include a plurality of client nodes 102, a cloud manager node 106, and one or more non-client nodes 104.

Each client node 102 is a distinct processing entity on which one or more applications can be run. The client nodes 102 are controlled by a cloud manager 108, which instructs the client nodes 102 as to which of the plurality of applications is run on which of the client nodes 102, and at which time the respective application is run. The cloud manager 108 is a program that runs on one or more of the nodes on the network 100. The cloud manager 108 can run on one or more of the client nodes 102 themselves, or, as in the example shown in FIG. 1, the cloud manager 108 can run on a separate cloud manager node 106. Each client node 102 includes a client manager 110, which is a program that communicates with the cloud manager 108 and controls which and how applications run on the corresponding client node 102 in accordance with instructions from the cloud manager 108. As used herein the one or more non-client nodes 104 on the network 100 include any nodes that are neither managed by the cloud manager 108 nor execute the cloud manager 108 itself.

Figure 2:
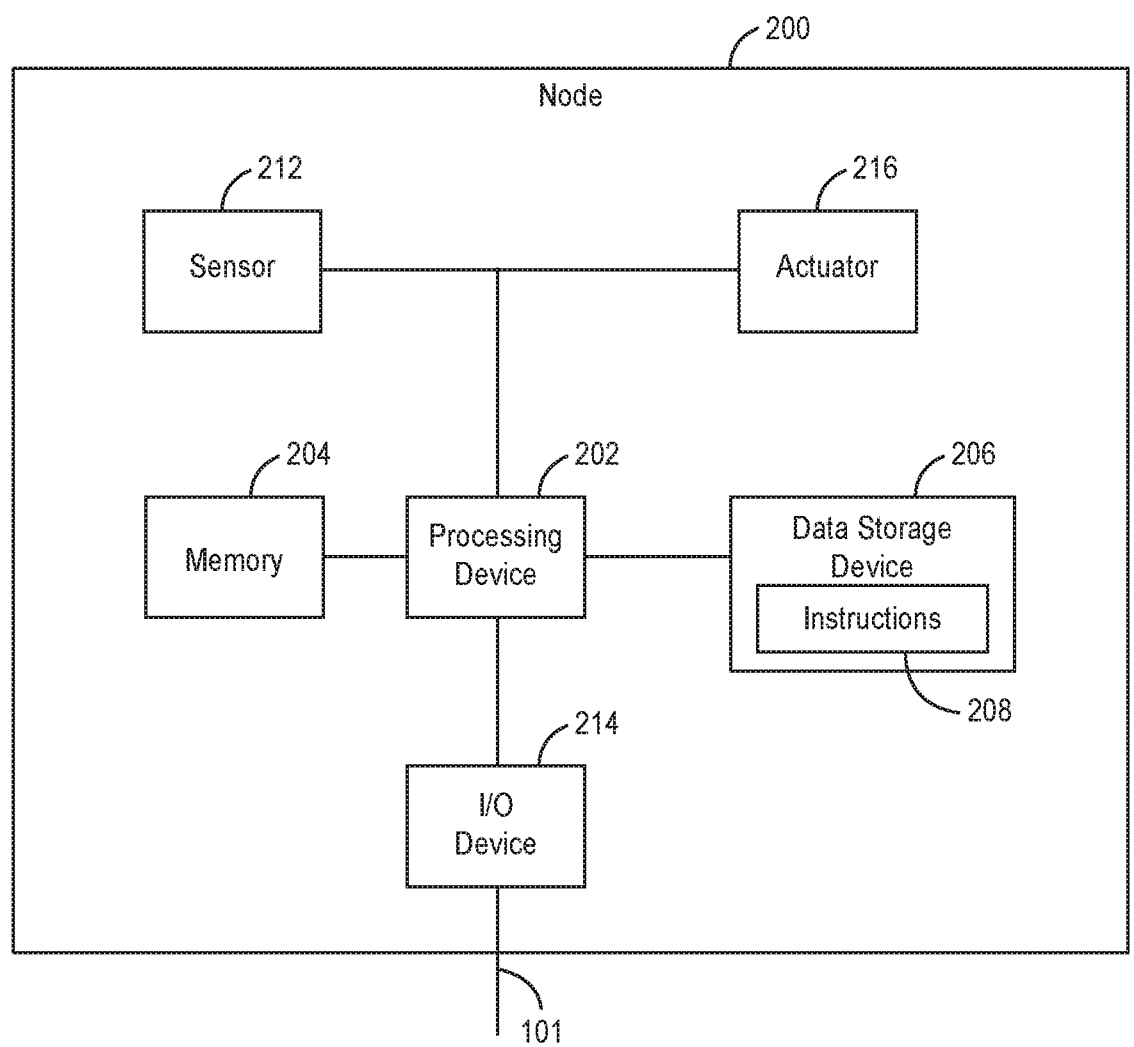
FIG. 2 is a block diagram of an example node of the network of FIG. 1.

FIG. 2 is a block diagram of an example node 200, which can be a client node 102, a non-client node 104, or a cloud manager node 106. Node 200 includes one or more processing devices 202 coupled to memory 204. The one or more processing devices 202 can include any one or more of a general-purpose processor (e.g., a central processing unit (CPU)) and a special-purpose processor (e.g., a digital signal processor (DSP) or graphics processing unit (GPU)). Memory 204 can include any suitable form of random access memory (RAM) now known or later developed, such as dynamic random access memory (DRAM), as well as other types of memory. Node 200 also includes one or more data storage mediums 206 coupled to the one or more processing devices 202. The one or more data storage mediums 206 can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM.

Node 200 includes instructions 208 stored or otherwise embodied on its respective one or more data storage mediums 206. The instructions 208, when executed by the one or more processing devices 202 of the node 200, cause the node 200 to perform the actions coded in the instructions.

The one or more processing devices 202, memory 204, and data storage mediums 206 are collectively referred to herein as the "hardware resources" of the client node 102. In addition to the one or more processing devices 202, memory 204, and data storage mediums 206, the hardware resources of a node 200 can include other hardware components on the node 200 such as one or more sensors 212, one or more input/output devices 214, one or more actuators 216 or other hardware component. In an example, at least one of the input/output devices 214 is a network interface (e.g., a wired interface (e.g., jack) or a wireless transceiver) through which communications to and from other nodes 200 in the network 100 occur.

Notably, each of the nodes 102, 104, 106 in network 100 is a distinct node 200. Accordingly, each node 102, 104, 106 includes a distinct one or more processing devices 202, memory 204, data storage mediums 206, instructions 208, input/output devices 214, etc. Each node 102, 104, 106 can have the same or different hardware resources than other nodes 102, 104, 106 in the network 100. For example, a first client node 102 can include a quad-core processor along with a DSP, a second client node 102 can include a CPU and a GPU, while a third client node 102 can include a CPU with a large capacity data storage medium.

Referring back to FIG. 1, the instructions 208 on each client node 102 include the client manager 110. The instructions 208 on the cloud manager node 106 include the cloud manager 108, which manages the client nodes 102 by communicating with the client manager 110 of each client node 102 over the network 100. In embodiments where the cloud manager 108 is implemented in a client node 102, or across one or more client nodes 102, each such client node 102 includes in its instructions 208, the cloud manager 108 or its portion of the cloud manager 108.

The communications between the cloud manager 108 and the client managers 110 can take any form suitable for network communications. In an example, the network communications conform to an Ethernet standard (in accordance with an IEEE 802.3 standard) or a Wi-Fi standard (in accordance with an IEEE 802.11 standard). The communications between the cloud manager 108 and the client nodes 102 can include instructions from the cloud manager 108 to activate an application, halt an application, and/or modify execution of an application. The communications can also include information sent from the client nodes 102, such as information obtained by an application running on a client node 102, requests from a client node 102, and information regarding the availability and/or use of hardware resources of the client nodes 102.

Network 100 implements multiple application domains for the plurality of applications. An application domain (also referred to herein as simply a "domain") is a hardware or software partition of the network 100. Each domain segregates the one or more applications and any non-client nodes 104 in its domain from any applications and non-client nodes 104 in other domains. Segregating the applications includes restricting the access of each application to processor(s), memory spaces, and data storage medium partitions such that an application in one domain cannot access a processor, memory space, or data storage medium that is accessible to an application in another domain. That is, each processor, memory space, and data storage medium is restricted to a single domain at a time. This segregation ensures that an application in one domain cannot access the data (surreptitiously or otherwise) from an application in another domain. Segregating the applications also includes controlling the flow of data in the network 100, such that data from an application or non-client node 104 in one domain is not accessible to applications or non-client nodes 104 in other domains.

Figure 3:
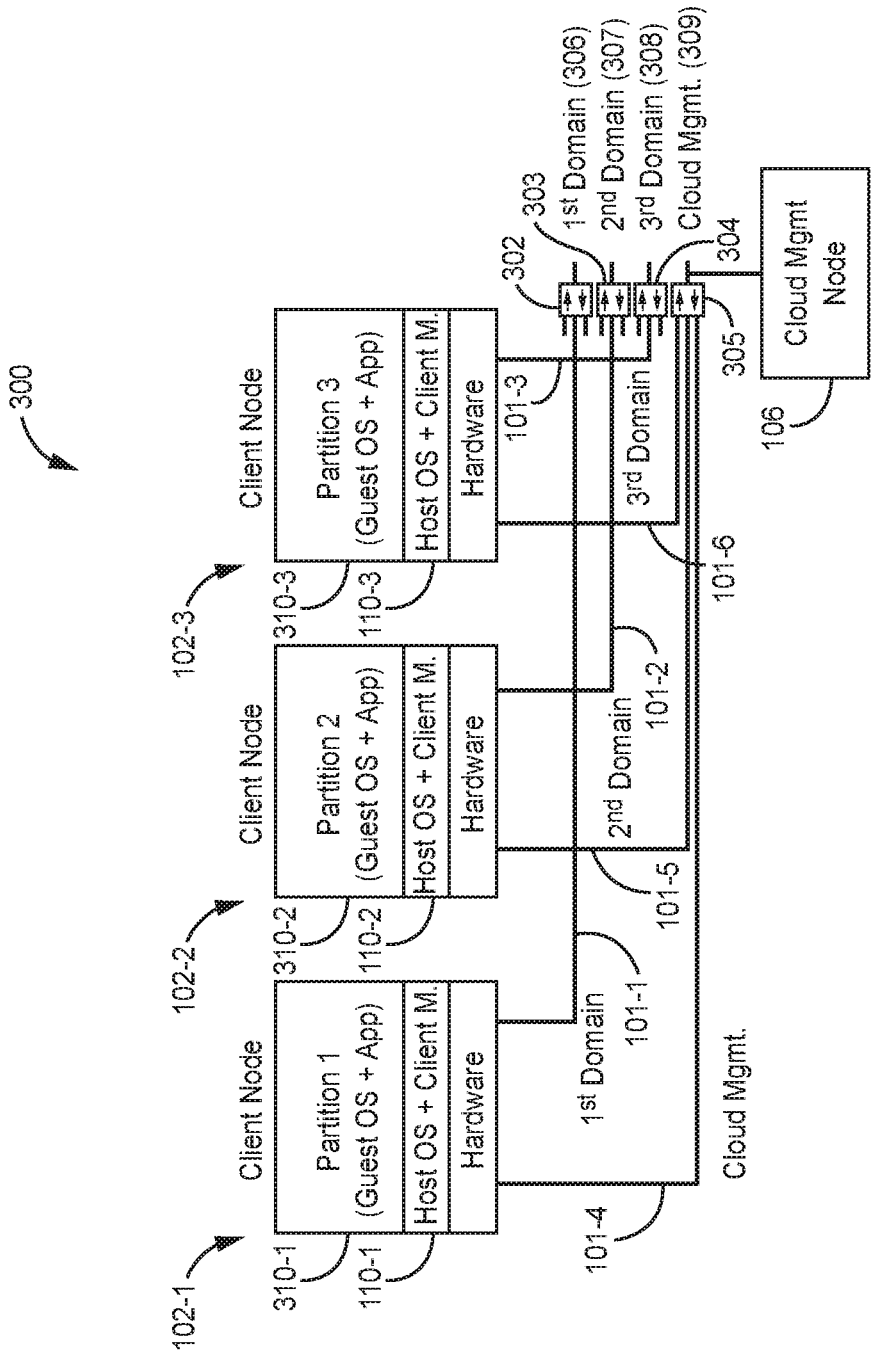
FIG. 3 is a block diagram illustrating an example implementation of multiple domains via physical separation in a portion of the network of FIG. 1.

FIG. 3 is a block diagram illustrating a portion 300 of network 100 in an example implementation of multiple domains. Network portion 300 includes a plurality of client nodes 102-1, 102-2, 102-3 and a cloud manager node 106. The cloud manager node 106 implements a cloud manager 108 as described above. The client nodes 102-1, 102-2, 102-3 are coupled to one or more other nodes 102, 104 (not shown) via network links 101 and a plurality of networking devices 302-305. Network portion 300 implements multiple domains 306-308 by physical isolation. That is, distinct physical equipment for each domain 306-308. The distinct equipment includes distinct nodes 102, 104, network links 101 (e.g., physical communication media) and networking devices 302-305 for each domain 306-308.

A first domain 306 of network portion 300 includes a first client node 102-1, a first networking device 302, and a first network link 101-1 communicatively coupling the first client node 102-1 to the first networking device 302. A second domain 306 includes a second client node 102-2, a second networking device 303, and a second network link 101-2 communicatively coupling the second client node 102-2 to the second networking device 303. A third domain 307 includes a third client node 102-3, a third networking device 304, and a third network link 101-3 communicatively coupling the third client node 102-3 to the third networking device 304. The first network link 101-1, second network link 101-2, and third network link 101-3 can be, respectively, a wireless link (i.e., a network link using wireless signals) or a physical link (i.e., a network link using a physical communication medium).

In physical isolation separation, a networking device 302-304 only communicatively couples together client nodes 102 and non-client nodes 104 that are in a common domain. That is, all client nodes 102 and non-client nodes 104 communicatively coupled to a given networking device 302-304 are in a common domain. Thus, all client nodes 102 and non-client nodes 104 communicatively coupled to the first networking device 302 are in the first domain 306, all client nodes 102 and non-client nodes 104 communicatively coupled to the second networking device 303 are in the second domain 307, and all client nodes 102 and non-client nodes 104 communicatively coupled to the third networking device 304 are in the third domain 308.

As can be seen, in physical isolation separation, separation between domains 306-308 is achieved by ensuring each client node 102, networking device 302-304, and network link 101 is in a single domain. Since each client node 102 is in a single domain, all applications executing on a client node 102 are in the domain of the client node 102. Thus, all applications executing on the first client node 102-1 are in the first domain 306, all applications executing on the second client node 102-2 are in the second domain 307, and all applications executing on the third client node 102-3 are in the third domain 308.

Access to processors, memory spaces, and data storage mediums for each application is restricted by the physical separation of the client nodes 102. That is, an application executing on the first client node 102-1 does not have access to the processor, memory space, or data storage mediums of other client nodes 102-2, 102-3, because each client node 102 has distinct processor(s), memory space(s), and data storage medium(s) not accessible to the processors of other client devices 102. Likewise, separation of network traffic is maintained by having distinct network links 101 and networking devices 302-304 for each domain 306-308.

In an example, each domain is a distinct one or more local area networks (LANs). In a first implementation of that example, each domain is a single LAN. Each LAN can operate in compliance with one or both of an Ethernet standard (in accordance with an IEEE 802.3 standard) or a Wi-Fi standard (in accordance with an IEEE 802.11 standard). In an example, each domain is defined by the corresponding one or more LANs (e.g., a single LAN). That is, the client node(s) 102 and non-client node(s) 104 that are members of a common LAN are in a common domain. Multiple LANs can be linked to form a single domain (e.g., with a router), or distinct LANs can be in different domains, but the edge of a domain corresponds to the edge of the one or more LANs which make up the domain.

In some examples, one or more trusted network devices (not shown) can be communicatively coupled to multiple domains if such a trusted network device can assure that it will not unintentionally send data from a first domain into another domain. An example trusted network device is a device that executes a trusted hypervisor, such as SecureView. Additionally, one or more cross-domain guards (CDG), e.g., a one-way guard, can be used to allow data from different domains to be fused at a client node 102. A CDG can check that only authorized data is passed to another domain. CDGs are known in the art. In some examples, a client node 102 can be configured as a CDG.

The cloud manager 108 executing on the cloud management node 106 manages client nodes 102 across multiple domains. That is, the cloud manager 108 can concurrently manage one or more client nodes 102 in the first domain 302, one or more client nodes 102 in the second domain 303, and one or more client nodes 102 in the third domain 304 during a single management session. Any number of domains can be managed concurrently.

Each application assigned by the cloud manager 108 is allowed to operate in one or more domains. The cloud manager 108 assigns each application to the client nodes 102 in accordance with the allowed domains of that application to ensure that each application operates only in an allowed domain. In physical separation isolation, assigning an application in accordance with its domain means that the application is only assigned to a client node 102 that is in an allowed domain of the application. The cloud manager 108 maintains information on the allowed domain(s) of each application and the domain of each client node 102 to use when assigning applications to a client node 102.

In the example shown in FIG. 3, the communications between the cloud manager 108 and the client nodes 102 occur over network links 101-4, 101-5, 101-6 and with network device(s) 305 that are distinct from the network links 101-1, 101-2, 101-3 and network devices 302-304 in the domains 306-308. In this example, each client node 102 includes at least a second network interface that is communicatively coupled to a distinct one or more LANs 309 from the LANs of the domains 306-308, wherein the first network interface of each client node 102 is communicatively coupled to the network device 302-304 in the client node's 102 domain 306-308. The communications between each client node 102 and the cloud manager 108 occur over the distinct LAN(s) 309. In such an example, the cloud manager node 106 and cloud manager 108 and corresponding network traffic are also maintained separate from each domain 306-308 by physical isolation. This can ensure that the one or more applications running on a client node 102 cannot compromise the cloud management communications, e.g., by consuming the entire network bandwidth to the client node 102.

In an alternative example, communications with the cloud manager 108 for one or more of the client nodes 102 occur over a common network link 101 with the domain communications for that client node 102. In such an alternative example, the cloud management node 108 is communicatively coupled to a networking device 302-305 in the corresponding domain of the client node 102. In a first implementation of such an alternative example, separation of the communications with the cloud manager 108 from the domain communications is accomplished by encrypting the cloud manager communications differently than the domain communications. In another implementation of the alternative example, the cloud manager communications are not separated from the domain communications, such that the cloud manager communications occur as regular network communications over the LAN(s) of the corresponding domain.

In physical isolation separation, a client node 102 can implement any appropriate operating system (OS) and the client manager 110 and application can be implemented in any appropriate manner. In the example shown in FIG. 3, the client managers 110-1, 110-2, 110-3 for each client node 102-1, 102-2, 102-3 are executed within a host OS running on the hardware of that client node 102-1, 102-2, 102-3. The applications assigned by the cloud manager 108 are executed within a guest OS. The guest OS runs on the host OS. The client manager 110-1, 110-2, 110-3 can intermediate communications between the cloud manager 108 and the applications on the corresponding client node 102, forwarding requests from the applications to the cloud manager 108 and receiving replies from the cloud manager 108 and forwarding the to the applications. The intermediation can isolate the cloud manager 108 from the applications and vice-versa to ensure that the cloud manager 108 does have access to the domain data or communications of applications running on the client node 102 and vice-versa. This intermediation can also reduce the need to configure applications to find and interact with the cloud manager 108 directly. This intermediation can also provide security by having the client manager 110 encrypt/decrypt communications sent to and from the cloud manager 108. Using the client manager 110 for this can be advantageous because a single signed and trusted application can perform the encryption/decryption. The client manager 110 can include an application facing application programming interface (API) for communications with the applications.

In an example, the application facing API can be a network service attached to a specially designated local IP address and port that is not routed or bridged to any physical network address. This allows the same local IP address to be used by every client manager instantiation for local communication without risk of conflict with other services, and allows applications to open a connection to the local client manager 110 with having to discover which host the application is on.

In an example, a hypervisor executes on a client node 102 to provide access control partitioning of the hardware resources of the client node 102, among other things. The client manager 110 executes within the hypervisor and communicates with the hypervisor to control the hypervisor. The hypervisor to implement a virtual machine for each application assigned to execute on the corresponding client node 102. In examples in which multiple domains are implemented, the client manager 110 can also instruct the hypervisor as to what access each virtual machine has to the hardware resources of the client node 102. That is, the client manager 110 can control, based on instructions from the cloud manager 108, which virtual machines are in which domain and provide access to the hardware resources (via instructions to the hypervisor) that effectuate the domains on the client node 102. The hypervisor can be a native (Type-1) hypervisor that executes directly on the hardware of the client node 102 or a hosted (Type-2) hypervisor that executes within an operating system on the client node 102.

Each application running on the client node 102 can be run in a distinct virtual machine (VM) or container on the host OS of the client node 102. Any appropriate virtualization/container solution can be used including, but not limited to, Linux containers (LXC) (e.g., an unprivileged container), Xen, kernel-based VM (KVM), or a separation kernel protection profile (SKPP).

In another example, a separation kernel executes on a client node 102 to provide access control partitioning of the hardware resources of the client node 102, among other things. The client manager 110 executes on the separation kernel and communicates with the separation kernel to control the separation kernel. The client manager 110 instructs the separation kernel to implement a container for each application assigned to execute on the corresponding client node 102. The client manager 110 can control the separation kernel in a similar manner to the control of the hypervisor example discussed above.

The hypervisor or separation kernel can implement a distinct virtual machine (VM) 804-809 or container for each application executing on the client node 102-1, 102-2, 102-3. The hypervisor or separation kernel can control access of the virtual machines/containers to the hardware resources of the client node 102-1, 102-2, 102-3 in accordance with instructions from the client manager 110. Any appropriate virtualization/container solution can be used to implement virtual machines/containers on the client nodes 102, including but not limited to Linux containers (LXC) (e.g., an unprivileged container), Xen, kernel-based virtual machine (KVM), or a separation kernel protection profile (SKPP).

The host OS of a client node 102 can implement one or more partitions 310-1, 310-2, 310-3 for the guest OS(s). Since each client node 102 operates in a single domain in the physical isolation approach, the OS of each client node 102 can implement a single partition with all the applications operating in that single partition. In other examples, multiple partitions can be implemented on a client node 102 (e.g., to optimize hardware resource usage), with all partitions on a given client node 102 in the same domain.

In other examples, the client manager 110 can be a user-level application that executes on a host operating system along with the applications controlled by the cloud manager 108. Such a client manager 110 can be a service-oriented client manager 110 that exposes a network facing API for communications with the cloud manager 108. The service-oriented API approach for a client manager 110 may be desirable for retrofit situations where reconfiguration of a client node 102 to include a hypervisor or secure kernel host OS is undesirable or not compatible. In the service-oriented API client manager 110, each application controlled by the cloud manager 108 can be a process running on the host operating system of the client node 102.

The cloud manager 108 can concurrently manage a heterogenous mix of client nodes 102 during a single management session. One or more of the client nodes 102 can implement a client manager 110 as a host OS running applications in respective guest OSs, while one or more other client nodes 102 can implement a service-oriented client manager 110 that runs as a user-level application on a host OS along with the applications.

Cloud manager 108 can determine which applications to assign to which client nodes 102 while matching domains between the applications and client nodes 102 by using a utility function. The utility function can factor in the domain of each client node 102 and the allowed domain(s) of each application to determine a client node 102 assignment for each concurrently running application that is collectively beneficial for all applications. The utility function provides a metric to measure the utility of a given hypothetical assignment of the plurality of applications on the client nodes 102. That is, the utility function provides a mathematical way to compare a first hypothetical assignment with one or more other hypothetical assignments, wherein each hypothetical assignment has different applications running at different times and/or on different client nodes 102.

Using the utility function, the cloud manager 108 can evaluate a list of authorized applications and the plurality of client nodes 102 to determine which of the authorized applications to execute on which of the plurality of client nodes 102. The cloud manager 108 can repeat these acts of identifying which one or more applications are scheduled to execute concurrently, and evaluating the list of authorized applications to dynamically manage which applications are assigned to which client nodes 102. The cloud manager 108 can maximize the utility function to determine which of the plurality of applications to run on which of the client nodes 102 at a given time.

In an example, the utility function can factor in other aspects in addition to the domain of each application and client node 102. The utility function can be a pre-configured function that factors in whichever of a plurality of different aspects are available. The aspects factored in by the utility function can be any aspect that can provide a differentiation in utility between two different implementations of applications on the client nodes 102. Example aspects include aspects of each respective application in the authorized applications. The aspects of an application are referred to herein collectively as the "profile" of the application, and the aspects of a client node 102 are referred to herein collectively as the "profile" of the client node 102. An example utility function can maximize a sum of yields, wherein each yield summed is a yield of an application calculated by the cloud manager 108 in a hypothetical implementation of the application according to a hypothetical application-client node 102 assignment for the plurality client nodes 102 and authorized applications. The cloud manager 108 can store and maintain a profile for each application and a profile for each client node 102. The profile of an application includes the aspects of that application, and the profile of a client node 102 includes the aspects of that client node 102.

FIG. 4 is two tables illustrating two example profiles 400, 401 of two different applications. Profile 400 corresponds to a first application and profile 401 corresponds to a second application. The profile 400, 401 of an application can include aspects 402 provided by an administrator (e.g., prior to running of the cloud management session) and aspects 404 obtained by the cloud manager 102 (e.g., during running of the cloud management session). Aspects 402 of an application provided by an administrator (i.e., a human that administers the system) can include a priority level of the application relative to other applications, a minimum required hardware for the application, a minimum length of time required to complete the application, desired hardware resources of the application, general load, floating point load (to ensure compute-intense software is not provisioned on a low power CPU), operating system, sensor access requirements, library requirements, and other aspects. Example hardware resources of an application that can be included in an application profile include the number and/or type of processing device(s) desired (e.g., DSP, GPU, GPGPU, CPU, FPGA), instruct set used (e.g., SIMD), memory type and/or size, data storage device type and/or size, network interface(s), and sensor(s). An aspect 404 of an application obtained by the cloud manager 102 can include a measured amount of hardware resources used (e.g., an average and/or peak use) by past use on a client node 102. The values in the profile of different applications can, and will likely, differ according to differences in the applications.

Other example aspects factored in by the utility function include aspects of each of the plurality of client nodes 102. Similar to the application aspects, aspects of a client node 102 are referred to herein as a profile of the client node 102. The profile of a client node 102 can include aspects provided by an administrator (e.g., prior to running of a cloud management session) and aspects obtained by the cloud manager 108 (e.g., during running of a cloud management session). An aspect of a client node 102 provided by an administrator can include the hardware resources of the client node. Aspects of a client node 102 obtained by the cloud manager 108 can include any hardware resources of the client node 102 that are currently unavailable for use by the cloud manager 108. A hardware resource may be currently unavailable, for example, because the hardware resource has malfunctioned or because the client node 102 has allocated the hardware resource to a task outside of the applications managed by the cloud manager 108.

In either case, the profile of a client node 102 can include any appropriate aspect such as hardware resources of the client node 102, unavailable hardware resources, client node name, IP address, operating system, domain, sensor system access, logging support, support for OpenCL, libraries (e.g., image processing library), and/or other aspects. Example hardware resources of a client node 102 that can be included in a client node profile include the number and/or type of processing device(s) of the client node (e.g., DSP, GPU, GPGPU, CPU, FPGA), instruct set used (e.g., SIMD), memory type and/or size, data storage device type and/or size, network interface(s), and sensor(s). In an example, the cloud manager 108 maintains a profile for each client node 102 of the network 100. Maintaining a profile can include updating the profile during client node management based on changes to the client node 102.

Additional example aspects for an application or client node profile are listed in the co-pending U.S. patent application Ser. No. 15/583,692, titled "PLANNED CLOUD RESOURCE MANAGEMENT", filed on even date herewith, which is hereby incorporated herein by reference.

The utility function can enable heterogenous client nodes 102 to be utilized in a manner that takes into account the specific hardware resources of each client node 102 by assigning applications to the client nodes 102 based on each client nodes 102 respective hardware resources and domain. This consideration of the distinct hardware resources and domain of each client node 102, as well as the distinct aspects of each application is accomplished by incorporating the application profiles and client node profiles into the utility function. As discussed above, an application profile can include hardware specific aspects like allowed domains, a minimum required hardware resource, and a desired hardware resource. Additionally, a client node profile can include aspects identifying the hardware resources of the client node 102. The utility function can be configured to try and match the hardware specific aspects of an application profile with corresponding hardware resources of a client node 102. Such a match can be preferred by the utility function by causing such a match to increase the overall utility output by the utility function. As should be understood, a utility function can balance many factors. As such, there may be instances when a higher utility is provided by not matching a hardware specific aspect of an application with a corresponding hardware resource, i.e., when other factors, such as a priority level of an application, outweigh the matching of the hardware resources. For example, in the absence of competing software applications, Node A, with substantial RAM and permanent storage might be allocated to Application 1, but if Application 2 requires a special-purpose coprocessor available only at Node A, Application 1 might instead be assigned by the Cloud Manager to Nodes B, C, and D, which have adequate RAM and together have equivalent data processing capacity from the view of Application 1. Advantageously, taking into account the distinct hardware resources of each client nodes enables the cloud management system to operate in and take advantage of clouds with diverse nodes. As such, the cloud management system can be implemented in existing networks of nodes, which were originally designed without cloud computing in mind.

The cloud manager 108 can include a planning module which an administrator interacts with to provide aspects of the applications and client nodes 102 to the cloud manager 108. The allowed domain(s) for an application and the allowed domain for a client node 102 can be provided to the cloud manager 108 from an administrator via the planning module. As mentioned above, the cloud manager 108 maintains the information regarding the allowed domain(s) of an application and the allowed domain of a client node 102 in the respective profile of the application or client node 102.

The utility function can factor in both aspects that are required to match between an assignment and a client node 102 and aspects that are optional. In an example, the allowed domain is an aspect that is required to match by the utility function. That is, the utility function requires that any application assigned to a client node 102 is allowed to operate in the same domain that the client node 102 is allowed to operate in. In the example shown in FIG. 3, an application that is allowed to operate in only the first domain 306 can be assigned to the first client node 102-1, since the first client node 102-1 operates in the first domain 306, but cannot be assigned to the second client node 102-2, or the third client node 102-3 since they operate in the second domain 307 and third domain 308 respectively. An application that is allowed to operate in either the first domain 306 or the second domain 307 can be assigned to the first client node 102-1 or the second client node 102-2, but not the third client node 102-3. Although the portion 300 of network 100 shown in FIG. 3 only includes a single client node 102 in each domain 306-308, multiple client nodes 102 can be included in a given domain, and an application allowed to operate in a domain can be assigned to any of the client nodes 102 operating in that domain.

The domains implemented by the cloud manager 108 can be used for any suitable purpose. An example purpose for the domains is to ensure respective sets of information remain distinct from one another. For example, in a medical setting is may be desired to maintain patient medical information separate from other information, such as billing and management information. Another example is in a passenger vehicle (e.g., car, aircraft, etc.), where it is desirable to keep passenger data (e.g., passenger Internet traffic) separate from data used to operate the vehicle (e.g., pilot, vehicle sensor, and navigation data). The domains can also be used to implement multiple security classifications of data in the same cloud network. For example, it may be desirable to keep secret data separate from secure but unclassified (SBU) data and ensure that SBU applications do not have access to secret data or other secret applications. In an example, the cloud manager 108, client managers 110 and corresponding management 106 and client nodes 102 are, or operate on, real-time operating systems.

Figure 5:
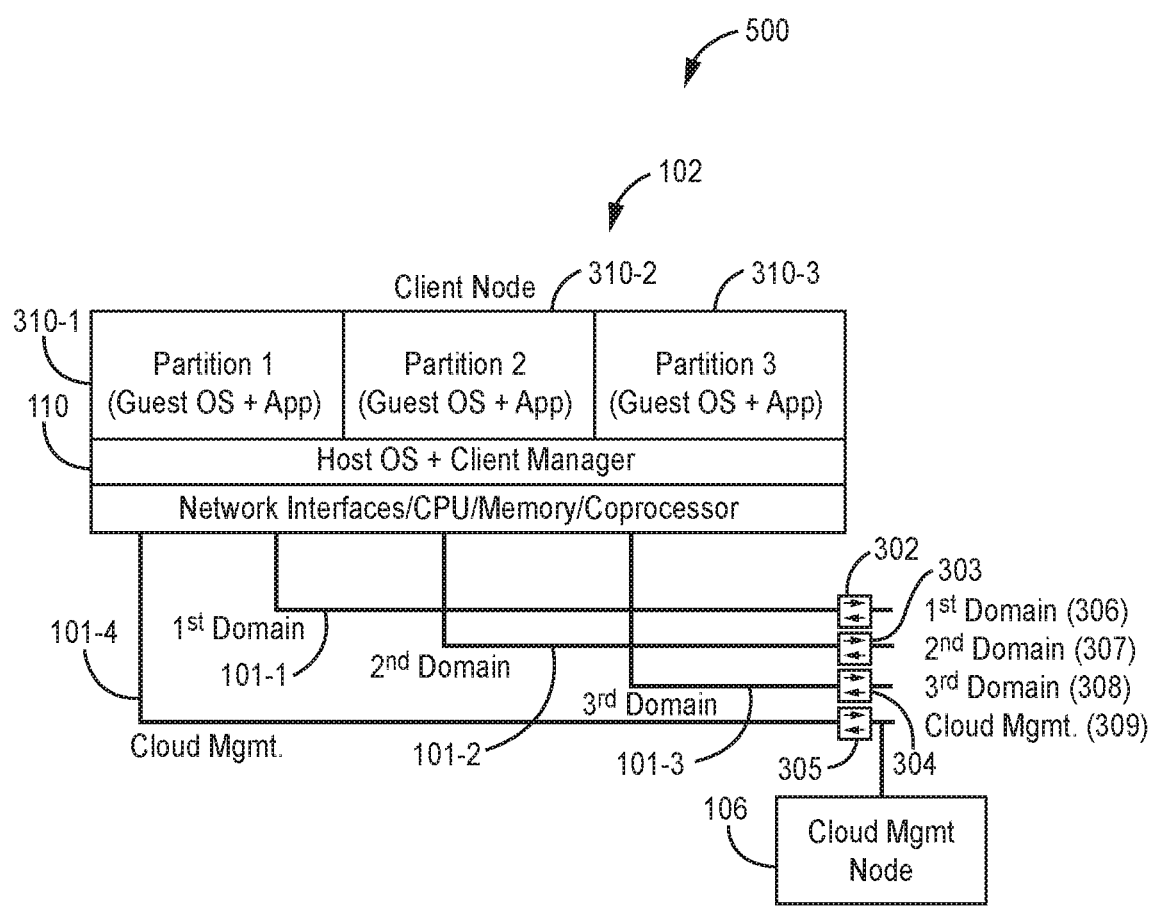
FIG. 5 is a block diagram illustrating an example implementation of multiple domains in a single node in a portion of the network of FIG. 1.

FIG. 5 is a block diagram of an example portion 500 of network 100 in which a single client node 102 can operate in multiple domains. Portion 500 of network 100 implements multiple domains by near physical isolation. In near physical isolation, separate networking devices 302-304 and network links 101 are used for each domain, but in contrast to the (full) physical isolation example shown in FIG. 3, in the near physical isolation example a single client node 102 can implement multiple domains 306-308.

To communicatively couple multiple domains, each with distinct networking device(s) 302-304 and network links 101 to a single client node 102, the client node 102 includes multiple network interfaces, one for each network link 101 connected to the client node 102. In the example shown in FIG. 5, the client node 102 operates in three domains 306-308 and is coupled to each of the domains 306-308 via a single respective network link 101-1, 101-2, 101-3. Each of the network links 101-1, 101-2, 101-3 is connected to a distinct network interface of the client node 102. The networking devices 302-304 and network links 101-1, 101-2, 101-3 themselves can be implemented in the same manner as the networking devices 302-304 and network links 101-1, 101-2, 101-3 described with respect to FIG. 3.

The client node 102 implements multiple domains by implementing multiple partitions 310 and implementing each domain in a disjoint set of the one more partitions. The client manager 110 of the client node 102 can execute in a host OS (e.g., a hypervisor as discussed above) that implements the multiple partitions 310. One or more respective guest OSes can execute within each partition 310, and the applications assigned by the cloud manager 108 can execute on the guest OS in the partition 310 of the domain in which the application is allowed. The client manager 110 via communication with the host OS ensures that all the applications in a given partition 310 are allowed to operate in the domain of that partition 310.

In an example, the host OS can be separation kernel protection profile (SKPP) compliant to ensure that distinct partitions are sufficiently isolated from one another. In such an example, each guest OS can have a distinct virtualized network interface. The host OS can provide access for each virtualized network interface to the physical network interface of the client node 102 corresponding to the distinct network link 101. The host OS can ensure domain isolation by allowing network traffic only between the one or more physical network interfaces assigned to a domain and the one or more partitions assigned to the same domain. The cloud manager 108 can maintain a list of which domains are implemented on the client node 102 at a given time and can assign the applications accordingly.

In an example, the client manager 110 can implement the multiple domains sequentially. That is, the applications in the multiple domains can share hardware resources of the client node 102 by providing each of the multiple domains access to the hardware resources of the client node 102, but restricting the timing of that access so that only one domain at a time has access to the hardware resources. Restricting the hardware access so that only one domain at a time has access to the hardware resources makes it difficult for an application in one domain to access an application or data on that client node 102 in another domain, because the application does not have access to the hardware resources of the client node 102 at the same time as applications in other domains.

In an example, the host OS in cooperation with the client manager 110 can control access to a hardware resource by implementing virtual machine for the drivers, etc. for the hardware resource and granting and revoking access to the virtual machines for the hardware resource for the virtual machines/guest OSes of the partitions 310. To grant access for the applications to a hardware resource (e.g., a processor or network interface), the host OS grants access for the virtual machine/guest OS in which the application is executing, to the virtual machine for the driver of that hardware resource. Likewise, access for an application to a hardware resource is removed by removing access for the virtual machine/guest OS in which the application is executing, to the virtual machine for the driver of that hardware resource.

In an example, the client manager 110 can sanitize the hardware resources of the client node 102 in between access for different domains. That is, at the end of an access time period for a first domain, the client manager 110 can sanitize the hardware resources of the client node 102 prior to granting access to a second domain. Sanitizing the hardware resources can include clearing the cache and registers of the processing device(s), as well as the memory used by the processing device(s). Sanitizing can reduce the risk that an application in the domain taking over access to the hardware resources can obtain data left over in the hardware resources by applications in the previous domain.

In an example, the sequential sharing of hardware resources includes the one or more processing devices, memory, and sensors, but does not include a data storage medium on the client node 102. The data storage medium can be partitioned and applications in each domain are stored, in a dormant state, on a partition corresponding to their domain. In an example, the client manager 110 switches from a first domain to a second domain by storing a current state and associated data of the activated application(s) in the first domain to their respective partition on the data storage medium. Once the current state and data of one or more of the activated applications is stored, the client manager 110 can remove access for the first domain and grant the access to the second domain as described above. The current state and data for the previously activated applications can be used to re-start the one or more previously activated application in the saved state during a subsequent time period for the first domain. The state and data for an application can be encrypted with two-layer encryption, wherein the guest OS provides an inner layer of encryption, and the client manager 110 provide an outer-layer of encryption. The outer-layer encryption keys are available to the client manager 110, but not to any application software on the client node 102.

During the time period in which a domain has access to the hardware resources, one or more than one partition 310 can be granted access to the hardware resources, as long as all the partitions 310 that are granted access during that time period are in a common domain. The length of the time period granted for a given domain can be any desired amount, for example, multiple domains can sequentially share the hardware resources of the client node 102 in a periodic manner. Such a periodic manner can include a repeating process in which each of the multiple domains getting access for a time period and then having no access for one or more time periods while the other domains have access. The length of a time period for a domain can be the same or different than then length of a time period for other domains.

In an example, the cloud manager 108 can off-load the sequential sharing of hardware resources of the client node 102 to the client manager 110. For example, the cloud manager 108 can instruct the client node 102 to activate multiple applications in multiple domains. The client manager 110 can implement these multiple domains sequentially as described above, and can determine, independently of the cloud manager 108, how much time each of the domains is allocated based on information available to the client manager 110. In an example, the client manager 110 can be aware of the profile of the applications activated on the client node 102 and can use this information in determining how much time to allocate to each domain. The cloud manager 108 can provide this information to the client manager 110 or the client manager 110 can be allowed remote access to the profile information on the cloud manager 108. Additionally or alternatively, the client manager 110 can measure aspects of each application, such as the hardware resource usage during initial time periods and allocate future time periods based thereon.

In another example, the cloud manager 108 can control the sequential sharing of hardware resources of the client node 102 by instructing the client manager 110 when to activate the one or more applications in each of the multiple domains. The client manager 110 can switch between the respective domains in response to the instructions.

In other examples, the client manager 110 can implement the multiple domains concurrently. The client manager 110 can virtualize the hardware resources of the client node 102 so that applications in different domains concurrently sharing the hardware resources do not have access to each other or their data.

More detail regarding how a client manager 110 can implement multiple domains, sequentially or concurrently, with multiple partitions 310 is provided below with respect to FIG. 9.

Each domain in the near physical isolation example can be a distinct one or more local area networks (LANs) in the same manner as described with respect to the physical isolation example of FIG. 3. Also, similar to the example of FIG. 3, the communications between the client node 102 and the cloud manager 108 can occur over a network link(s) 101-4 and with network device(s) 305 that are distinct from the network links 101-1, 101-2, 101-3 and network devices 302-304 in the domains 306-308. In such an example, communications between the client node 102 and the cloud manager 108 can occur of a distinct LAN from the domain communications for that client node 102. Accordingly, cloud management communications occur over a distinct one or more ports from the network interface/ports of the domains for that client node 102. The communications between the cloud manager 108 and the client node 102 can occur with the host OS, and the host OS can be a trusted OS that ensures that communications between that client node 102 and the cloud manager 108 do not have access to the guest OSes in the same manner as discussed above with respect to FIG. 3.

In an alternative example, communications with the cloud manager 108 are not separated from the domain communications, occurring over a common network link 101-1, 101-2, 101-3 with one or more of the domain communications for that client node 102.

The cloud manager 108 assigns applications to the client nodes 102 in the same manner as discussed above with respect to FIG. 3, except that for a client node 102 that implements multiple domains, the cloud manager 108 can assign an application allowed to operate in any of the multiple domains to that client node 102. In an example, the cloud manager 108 can maintain in the profile for a multi-domain client node 102, a list of the domains that the client node 102 is allowed to operate in, and which of those domains are currently being implemented by the client node 102. Additionally, the cloud manager 108 can maintain a client node-domain profile for each domain that can be implemented by the client node 102, the client node-domain profile including information that is specific to each domain on the client node 102. For example, of the hardware resources available at the client node 102, only a portion of the resources (e.g., in time) are available (e.g., allocated) to a domain operating on that client node 102, since the hardware resources of the client node 102 are shared by all the domains. Accordingly, the client node-domain profile can indicate the portion of the resources available to that domain. The cloud manager 108 can use this information in the utility function to come up with the application-client node 102 assignments for the network 100. The client manager 110 can ensure that the applications in which the cloud manager 108 instructs to run on a client node 102, are run in a partition on the client node 102 that is in an allowed domain of the application. In an example, the client manager 110 can dynamically create and erase partitions, such that the number of partitions on the client node 102 can be changed over time. This can be used, for example, to erase a partition for a domain for which no applications are assigned to the client node 102 allowing the resources for that partition to be re-allocated to other domains, if desired.

Although a single multi-domain client node 102 is shown in FIG. 5, multiple multi-domain client nodes 102 can be controlled by a single cloud manager 108. Moreover, a mix of single domain client nodes (FIG. 3) and multi-domain client nodes (FIG. 5) can be coupled to and simultaneously controlled by a single could manager 108. As compared to the example of FIG. 5, the multi-domain client node 102 of FIG. 8 can enable increased client node 102 re-use, since the multi-domain client node 102 can be assigned applications in different domains.

As an alternative to the multiple networking devices 302-305 of FIGS. 3 and 5, one or more virtual local area network (VLAN) switches could be implemented to provide distinct LANs for multiple domains. As known, a VLAN switch allows a single switch to operate on multiple LANs with different ports of the switch statically assigned to different LANs. Each LAN operated on by the switch is referred to as a VLAN, and the ports assigned to a VLAN are said to be in the VLAN group. An administrator manually configures the switch to statically assign the ports of the VLAN switch to a respective VLAN. As each VLAN is a separate LAN, devices on a common VLAN have direct (non-routed) communication with each other, including layer-2 broadcast and services dependent on layer-2 broadcast like ARP discovery and DHCP server discovery. Devices on different VLANS of a VLAN switch have no direct communication, but may communicate via an uplink, usually via a router to maintain traffic separation.

In an example, one or more high-assurance multi-domain network switches discussed in U.S. patent application Ser. No. 15/583,661, titled "HIGH-ASSURANCE MULTI-DOMAIN NETWORK SWITCH", can be used as a VLAN switch alternative to the multiple networking devices 302-305. The U.S. patent application Ser. No. 15/583,661, titled "HIGH-ASSURANCE MULTI-DOMAIN NETWORK SWITCH" and filed on even date herewith is hereby incorporated herein by reference. Such a high-assurance multi-domain network switch provides assurance that network traffic in a first domain remains isolated from network traffic in other domains while the traffic is traversing the switch. To aid in securing such a switch, the cloud manager 108 can provide to the switch the MAC address of each client node 102, non-client node 104, and/or manager node 106 coupled to the other end of a network link 101 that is connected to a port of the switch, and information of which port of the switch the corresponding MAC address is coupled to. The switch can use this information to ensure packets are being received at a given port from the correct MAC address. The cloud manager 108 can also receive information from the switch regarding dropped packets and can analyze the information to identify errors or misconfigurations in the network. The cloud manager 108 can then update the switch port domain assignments or application assignments, or send an alert to an administrator, if necessary, to address any errors of misconfigurations identified.

Another feature of VLAN switches is trunking. VLAN switches can be connected to a trunk backbone to communicate with each other. Ports on separate switches assigned to the same VLAN appear to be on a single switch. Packets for a common VLAN are forwarded between the trunked switches. Broadcast messages are forwarded to all switches on the VLAN, while unicast packets are forwarded only if the destination host is on a different switch according to the bridging rules. In an example, each trunk line between two VLAN switches is for a single domain, although multiple VLAN groups within that domain may operate over a single trunk line, for example, to separate one or more high-data rate sources to avoid overwhelming the trunk bandwidth.

In the physical isolation example of FIG. 3 and the near physical isolation example of FIG. 5, switching a client node 102 to from one of its current domains to a different domain involves taking down the network link 101 in a current domain (e.g., by disconnecting a network cable or disconnecting a wireless link) and replacing it with a new network link 101 (e.g., by connecting a network cable or creating a wireless link) in the different domain.

Figure 6:
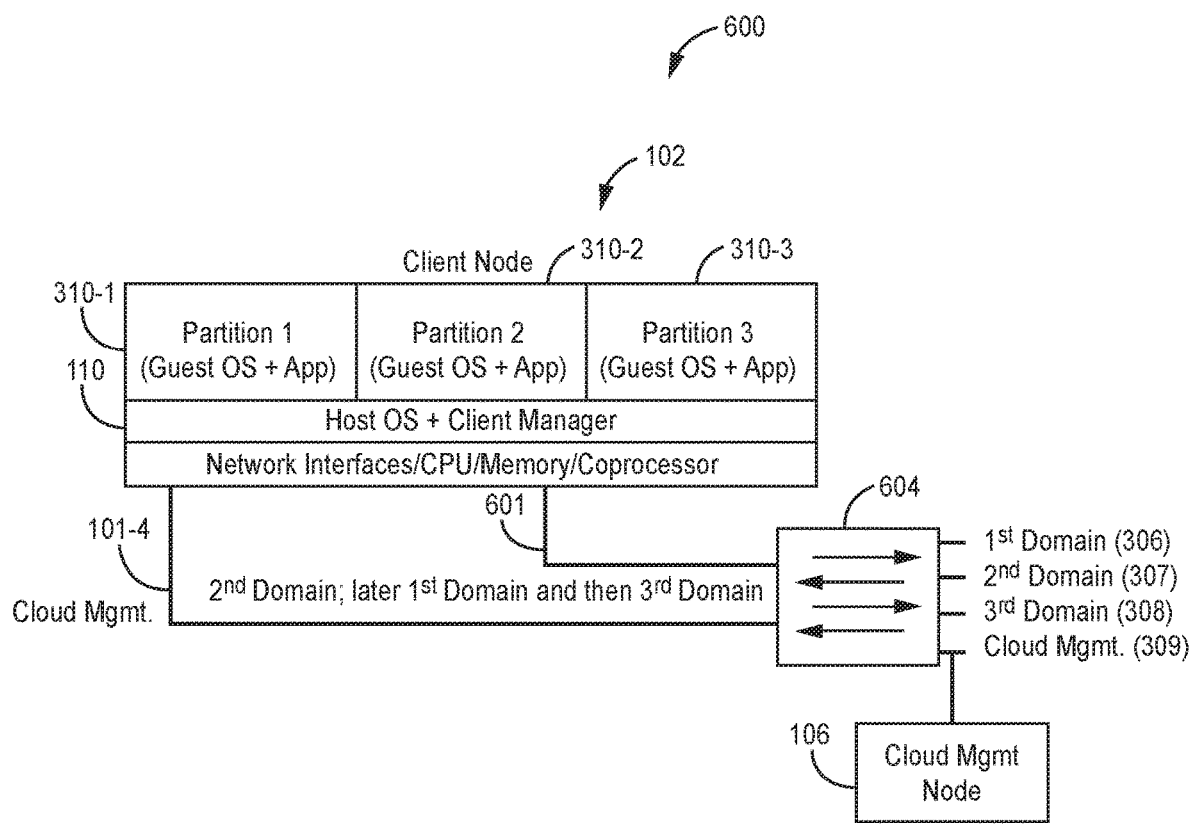
FIG. 6 is a block diagram illustrating an example implementation of multiple domains sequentially sharing a physical communication medium in a portion of the network of FIG. 1.

FIG. 6 is a block diagram of another example portion 600 of network 100, in which a single client node 102 implements multiple domains sequentially over a single physical communication media (PCM) 601. The client node 102 of FIG. 6 implements multiple domains, one domain at a time, over the PCM 601. This is advantageous because it enables a client node 102 to share a single PCM 601 between multiple domains, one domain at a time on the PCM 601.

Similar to the multi-domain client node 102 of FIG. 5, the client node 102 of FIG. 6 implements multiple domains by implementing multiple partitions 310 and implementing each domain in a disjoint set of the one or more partitions 310. The client manager 110 of the client node 102 can be a host OS (e.g., a hypervisor as discussed above) that implements the multiple partitions 310. Each partition 310 can implement one or more respective guest OSs on which the applications assigned by the cloud manager 108 can run. Accordingly, the client manager 110 implements one or more partitions 310 for each domain operating on the client node 102 and ensures that all the applications in a given partition 310 are allowed to operate in the domain of that partition 310.

In an example, the host OS can be separation kernel protection profile (SKPP) compliant to ensure that distinct partitions are sufficiently isolated from one another. In such an example, each guest OS can have a distinct virtualized network interface. The host OS can provide selective access for each of the partitions 310 to the physical network interface of the client device 102 to which PCM 601 is connected. By controlling which partition 310 has access to the physical network interface of the client device 102, the host OS can control which partition 310 can communicate over the PCM 601 during a given period. The host OS can create a port controller that runs in a distinct virtual machine, wherein the port controller implements the hardware driver and any additional frame handling for sending and receiving packets over the physical network interface. The Host OS can control which partition 310 (and its applications) has access to the physical network interface by granting and revoking access (i.e., communication capability) between the virtual machine for the port controller and the virtual machines for the respective partitions 310. The Host OS controls which partition 310 has access the physical network interface in response to commands from the cloud manager 110 to implement a given domain over the PCM 601 at a given time. Granting access between a physical network interface and a partition is assigning the physical network interface to the domain of that partition. Likewise, revoking access to the physical network interface for a partition, removes the physical network interface from the domain. In some examples, in addition to granting and revoking access to the virtual machine of the port controller, the host OS can destroy the port controller and re-create a new one when re-assigning the physical network interface to a new domain/partition 310.

Although only a single PCM 601 for domain data is shown in FIG. 6, in other examples multiple PCMs or network links 101 can be used, each such network link 101 connected to a distinct physical network interface of the client node 102. Each such network link 101 can be shared, sequentially, by a domain, if desired. The host OS can ensure domain isolation by allowing network traffic only between the one or more physical network interfaces of the client node 102 assigned to a domain and the one or more partitions assigned to the same domain. The client node 102 can implement the multiple domains simultaneously or sequentially. The cloud manager 108 can maintain a list of which domains are implemented on the client node 102 at a given time and can assign the applications accordingly.

The PCM 601 communicatively couples the client node 102 to a dynamically partitioned network switch 604 (also referred to as a high-assurance switch (HAS)). The dynamically partitioned network switch 604 can dynamically switch a given network link 101-1 from a first domain to a second domain. In an example, the dynamically partitioned network switch 604 can dynamically switch the hardware port of the network switch 604 connected to PCM 601 from a first domain to a second domain. Thus, a single PCM 601 can be used by multiple domains sequentially. Each domain in the example shown in FIG. 6 can be a distinct one or more local area networks (LANs) in the same manner as described with respect to the examples of FIGS. 3 and 5. Accordingly, in an example, the dynamically partitioned network switch 604 can dynamically switch a port from one domain to another domain by switching the port from a first LAN to a second LAN. An example dynamically partitioned network switch 604 is described in co-pending U.S. patent application Ser. No. 15/583,661, filed on even date herewith, which is hereby incorporated herein by reference.

The cloud manager 108 can control which domain is implemented over the PCM 601 by controlling the client node 102 and the switch 604. The cloud manager 108 can control the client node 102 via its communications with the client manager 110. In addition to controlling which applications are running on the client node 102, the cloud manager 108 can control which domains on the client node 102 have access to the PCM 601. The cloud manager 108 can instruct the client manager 110 of the client node 102 to couple one of the domains 306-308 to the PCM 601. In response to the instruction, the client manager 110 can assign virtual bridges to the applications operating in that domain to the physical address of the network interface for the PCM 601. The client manager 110 can restrict access to the network interface for the PCM 601 for any applications operating in other domains.

The cloud manager 108 can control the switch 604 via control messages (e.g., layer-2 or layer-3 messages). The control messages can be sent to the switch 604 and can instruct the switch 604 as to which domain and/or LAN to include the port for PCM 601 in. In an example, to avoid the possibility of control by anything other than the cloud manager 108, management station communication with switch(es) 604 may be separate from management station communication with client nodes 102, e.g., via an additional Ethernet link. More detail regarding the communications to and from switch 604 are provided in the co-pending U.S. patent application Ser. No. 15/583,661.

The cloud manager 108 can control the client node 102 and the switch 604 to ensure that the applications running on the client node 102 that are bridged to the network address (of the client node's network interface) of the PCM 601 are allowed to operate in the domain that the switch 604 has connected to the port for PCM 601. In this way, the cloud manager 108 can ensure that the domain to which the applications on the client node 102 have access to over the PCM 601 is an allowed domain for those applications. Cloud manager 108 can also ensure that the domain is an allowed domain for the client node 102 prior to assigning the applications to the client node 102.

The cloud manager 108 can maintain a list of the domain(s) being implemented by the client node 102 and the switch 604 and control them based on the applications assigned to run on the client node 102. In particular, the cloud manager 108 controls the domains of the hardware ports of the switch 604 in order to implement the application-client node assignments determined based on the utility function as discussed above. For example, if the cloud manager 108 determines that client node 102 is to be assigned a first application in a first domain at a first time, the cloud manager 108 sends an instruction to the switch 604 instructing the switch 604 to assign the hardware port connecting the PCM 601 to the first domain. The cloud manager 108 also sends an instruction to the client node 102 instructing the client node 102 to execute the first application and assign the first application to the client node's network interface to which PCM 601 is connected. If the cloud manager 108 determines that client node 102 is to be assigned a second application in a second domain at a second time, the cloud manager 108 sends another instruction to the switch 604 instructing the switch to assign the hardware port connecting the PCM 601 to the second domain. The cloud manager 108 also sends an instruction to the client node 102 instructing the client node 102 to run the second application and assign the second application to the client node's network interface to which PCM 601 is connected.

If the cloud manager 108 determines that the client node 102 is to run an additional application that is in the same domain as the switch 604 has assigned to the PCM 601, the cloud manager 108 does not need to send an instruction to the switch 604 to change the assignment of the network interface of the client node 102 for the PCM 601, since the network interface is already assigned to the proper domain for the additional application. Cloud manager 108 may, however, send an instruction to the client node 102 instructing the client node 102 to send communications to/from the additional application to/from the network interface attached to the PCM 601.

During the time period in which a domain has access to the PCM 601, one or more partitions 310 in that domain can be granted access to the PCM 601, as long as all the partitions 310 that are granted access during that time period are in a common domain. The length of the time period can be any desired amount, for example, multiple domains can sequentially share the PCM 601 in a periodic manner. Such a periodic manner can include a repeating process in which each of the multiple domains getting access for a time period and then having no access for one or more time periods while the other domains have access. The length of a time period for a domain can be the same or different than then length of a time period for other domains.

In an example, the cloud manager 108 can off-load the sequential sharing of the PCM 601 to the client manager 110. For example, the cloud manager 108 can instruct the client node 102 to activate multiple applications in multiple domains. The client manager 110 can implement these multiple domains and can determine, independently of the cloud manager 108, how much time each of the domains is allocated to the PCM 601 based on information available to the client manager 110. In an example, the client manager 110 can be aware of the profile of the applications activated on the client node 102 and can use this information in determining how much time to allocate to each domain. The cloud manager 108 can provide this information to the client manager 110 or the client manager 110 can be allowed remote access to the profile information on the cloud manager 108. Additionally or alternatively, the client manager 110 can measure aspects of each application, such as the hardware resource or network link 101 usage during initial time periods and allocate future time periods based thereon.

In another example, the cloud manager 108 can control the sequential sharing of the PCM 601 by instructing the client manager 110 when to grant access to the PCM 601 for each domain. The client manager 110 can switch between the respective domains in response to the instructions.

The multiple domains can be run on the hardware resources of the client node 102, with the exception of the network interface, either sequentially or concurrently as described above with respect to FIG. 5. In examples where the multiple domains are run on the hardware resources sequentially, the timing of the running of the multiple domains can be coordinated with the timing of the access to the PCM 601 such that the two-time periods coincide. In examples where the multiple domains are run on the hardware resources concurrently, the multiple domains can run concurrently, while the access to the PCM 601 is granted sequentially. While a domain does not have access to the PCM 601, applications can still be run in the domain, however, the applications would have to wait until access is granted to their domain for network communications.

Although a single PCM 601 for domain data is shown connected between the client node 102 and the switch 604, in other examples multiple PCM 601 can be connected between the client node 102 and one or more dynamically partitioned network switches 604. In such an example, the cloud manager 108 can control the client node 102 and each of the one or more network switches 604 to implement a respective domain, which may be same or different from the domain of the other PCMs 601, one domain at a time, on each PCM 601 in the manner described above. The client manager 110 can ensure that the proper applications are bridged to the proper network address of such a client node 102 to ensure that the applications are coupled to the PCM 601 operating in the correct domain for that application. In an example, multiple switches 604 can be trunked together or a switch 604 can be trunked together with a VLAN switch.

Switch 604 can also have multiple PCMs 601 connected to it to/from one or more client nodes 102, and the cloud manager 108 can dynamically adjust the domain assigned to each PCM 601 in response to instructions from the cloud manager 108 in the manner described above. The cloud manger 108 can control each of the multiple jack/PCM assignments of the switch 604 individually to assure that each jack of the switch 604 is assigned to a domain that is allowed by the applications assigned to the client node(s) 102 communicating through that jack.

Similar to the example of FIGS. 3 and 5, the communications between the client node 102 and the cloud manager 108 can occur over a network link 101-4 that is distinct from the network links 101 implemented over the PCM 601. The network link 101-4, however, can be implemented by the dynamically partitioned network switch 604. In such an example, communications between the client node 102 and the cloud manager 108 can occur of a distinct LAN from the domain communications for that client node 102. Accordingly, cloud management communications occur over a distinct one or more ports of the client node from the ports of the domains for that client node 102. The communications between the cloud manager 108 and the client node 102 can occur with the host OS, and the host OS can be a trusted OS that ensures that communications between that client node 102 and the cloud manager 108 do not have access to the guest OSes.

In an alternative example, communications with the cloud manager 108 are not separated from the domain communications, occurring over the PCM 601 with the domain communications currently being implemented by the client node 102.

Although a single client node 102 is shown in FIG. 6, it should be understood that multiple of the client nodes 102 of FIG. 6 can be controlled by a single cloud manager 108. Moreover, a mix of single domain client nodes (FIG. 3), multi-domain client nodes (FIG. 5), and/or sequential multi-domain-per-PCM client nodes (FIG. 6) can be coupled to and simultaneously controlled by a single could manager 108.

As compared to the multi-domain client node 102 of FIG. 5, the sequential multi-domain-per-PCM client node 102 of FIG. 6 can implement multiple domains with fewer network interfaces on the client node 102. Thus, a client node with one or two network interfaces can still be used to implement multiple domains. Moreover, fewer networking devices may be used to implement multiple domains since a single dynamically partitioned network switch 604 can implement multiple domains.

Figure 7:
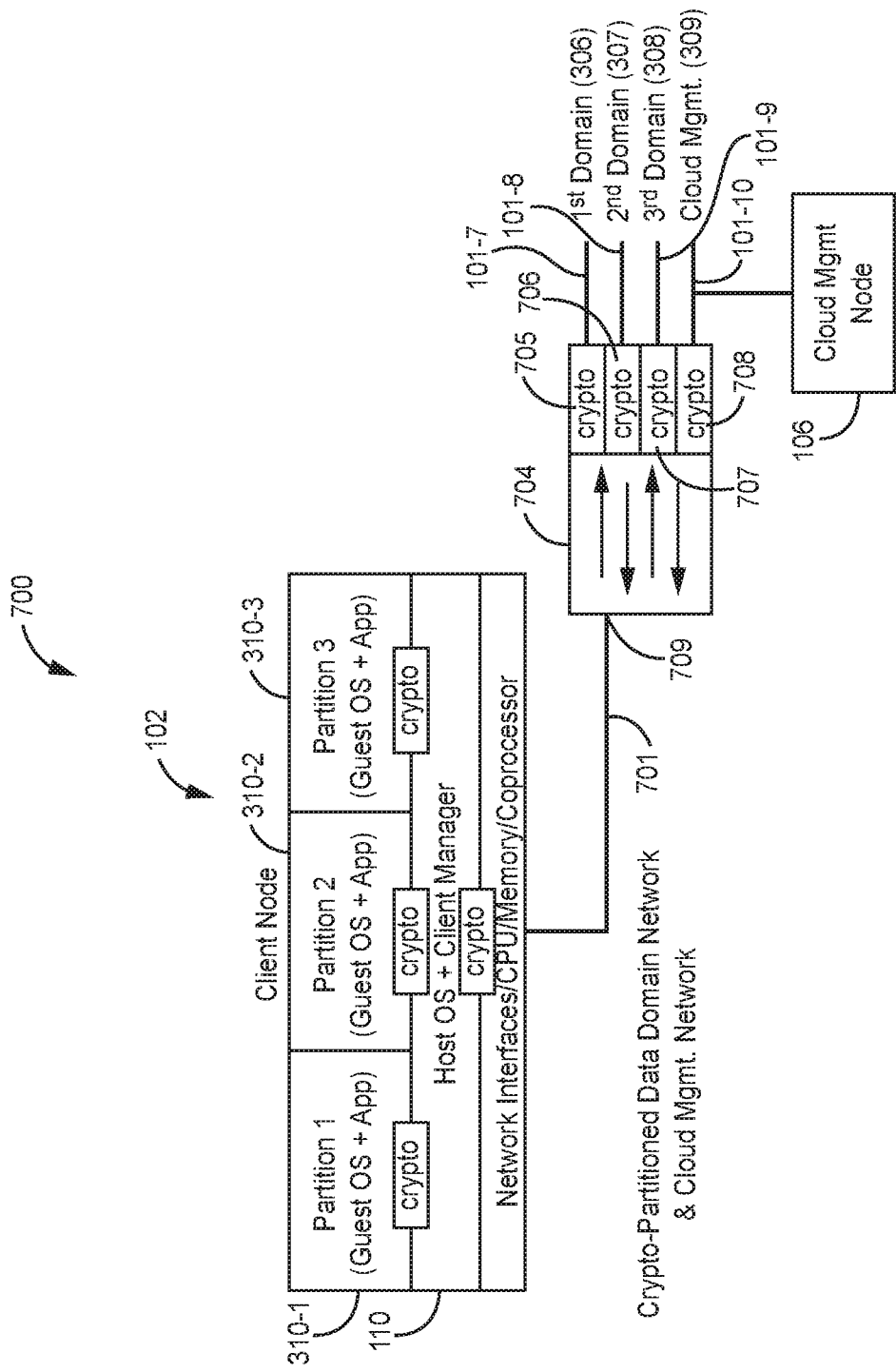
FIG. 7 is a block diagram illustrating an example implementation of multiple domains sharing a physical communication medium via crypto-partitioning in a portion of the network of FIG. 1.

FIG. 7 is a block diagram of another example portion 700 of network 100 in which multiple domains are implemented over a single physical communication medium (PCM) 701. Portion 700 of network 100 implements multiple domains concurrently over a single PCM 701 between the client node 102 and a single crypto-partitioned network switch 704 (also referred to as a high-assurance switch (HAS)). The crypto-partitioned network switch 704 is communicatively coupled to the client node 102 via the single PCM 701. The crypto-partitioned network switch 704 can forward data from multiple domains concurrently, while encrypting/decrypting the data for each domain individually. Thus, a single PCM 704 can be used by multiple domains concurrently, while still keeping each domain's data separate via encryption.

Switch 704 includes a plurality of hardware ports, some of the ports are non-encrypting ports and other ports are encrypting ports. Each encrypting port 705-708 has an encryption key/decryption key corresponding thereto. The switch 704 encrypts all data incoming to the switch 704 at an encrypting port 705-708 with the encryption key corresponding to that encrypting port 705-708. The switch 704 also decrypts all data outgoing from the switch 704 from an encrypting port 705-708 with the key corresponding to that encrypting port 705-708. The switch 704 does not encrypt or decrypt data traversing (incoming or outgoing) through a non-encrypting port 709. The encrypting and decrypting performed by the switch 704 encrypts and decrypts the payload of a packet, while the IP header remain unencrypted to allow for forwarding through the network. In an example, the switch 704 uses the IPsec protocol as standardized by the Internet Engineering Task Force (IETF) to encrypt and decrypt packets. An example crypto-partitioned network switch 704 is described in the co-pending U.S. patent application Ser. No. 15/583,661.

Similar to the multi-domain client node 102 of FIGS. 5 and 6, the host OS for the client node 102 of FIG. 7 can implement multiple domains 306-308 by implementing multiple partitions 310-1, 310-2, 310-3 and implementing each of the multiple domains 306-308 in a disjoint set of one or more of the multiple partitions 310-1, 310-2, 310-3. The client manager 110 of the client node 102 can be a host OS (e.g., a hypervisor as discussed above) that implements the multiple partitions 310-1, 310-2, 310-3. A respective guest OS can run on each partition 310-1, 310-2, 310-3, and applications assigned by the cloud manager 108 can run on the guest OSes. The cloud manager 108 can ensure that applications are assigned to a partition 310-1, 310-2, 310-3 on the client node 102 that is in an allowed domain of the application in the same manner as described above with respect to FIG. 6. In example, the host OS can be SKPP compliant.

The client node 102 and the crypto-partitioned switch 704 communicate data from distinct domains concurrently over a single PCM 701 by encrypting the data from each domain 306-308 with a different key. Thus, the data from a first domain 306 is encrypted with a first key and the data from a second domain 307 is encrypted with a second key. The data remains encrypted while it is traversing any portion of the network 100 that is common to multiple domains 306-308. In the example shown in FIG. 7, the PCM 701 and the switch 704 are common to multiple domains 306-308. Thus, the data is encrypted while traversing the PCM 701 and the switch 704. Each of network links 101-7, 101-8, 101-9 is in a single domain, while network link 101-10 is used for communications with the cloud manager 108.

The switch 704 is set up such that a port at a boundary of a common domain area is an encrypting port 705-707 and a port having both sides within a single domain or both sides within a common domain is a non-encrypting port 709. The switch 704 is set up in this way so that data in the common domain area is encrypted to maintain separation of data from distinct domains 306-308, and data outside of the common domain area is unencrypted, since physical, near-physical, VLAN, or sequential multi-domain-per-PCM (FIG. 6) separation is used in areas outside of the common domain area to maintain separation of data from different domains 308-309. In the example shown in FIG. 7, a first port 705 is at a boundary between a single domain (network link 101-7 is in a single domain) and a common domain area (switch 704 is a common domain area). Thus, first port 705 is an encrypting port. Similarly, second port 706 and third port 707 are encrypting ports. Fourth port 708 is also an encrypting port as it is at the boundary between the common area of switch 704 and the cloud management communication area. Fifth port 709 is a non-encrypting port as both sides of the fifth port 709 are in the common domain area.

Since PCM 701 is in a common domain area and each partition 310-1, 310-2, 310-3 of a client node 102 is in a respective domain, each partition 310-1, 310-2, 310-3 is at a boundary between a common domain area and its respective single domain. Thus, the guest OS of each partition 310-1, 310-2, 310-3 or the VM/container/application itself can be configured to encrypt the data outgoing to and decrypt the data incoming from the common domain area of PCM 701. The guest OS/VM/container/application encrypts/decrypts the payload of a packet and but does not encrypt/decrypt the IP header. In an example, the IPsec protocol is used for encryption/decryption.

In an example, a second layer of encryption occurs inside the IPsec layer by the guest OS/VM/container/application. This second layer of encryption can be used to insure against data leakage and to meet NSA Suite B cryptography requirements if they apply. The second layer of encryption can be unencrypted by the peer application with which the particular application is communicating.

The guest OS/VM/container/application encrypts the packets and sends them over the PCM 701 to the switch 704. The packet remains encrypted while the switch 704 forwards the data from the incoming non-encrypting port 709 (to which the PCM 701 is coupled) to the proper outgoing port 708-706 for the packet. After the outgoing port for the packet from the client node 102 is determined by the switch 704, but before the data is actually sent on the network link 101-7, 101-8, 101-9, the switch 704 decrypts the packet. The unencrypted data/packet is then sent over the network link 101-7, 101-8, 101-9 coupled to that outgoing port.

In the example shown in FIG. 7, each of the encrypting ports 705-707 is coupled to a network link 101-7, 101-8, 101-9 in a different domain. Thus, the first port 705 is at a boundary of the common domain area and a first (single) domain 306, the second port 706 is at a boundary of a second domain 307, and the third port 707 is at a boundary of a third domain 308. The fourth port 708 is at the boundary of the cloud management data 309 to/from the cloud manager node 106. Since the data from each domain 306-308 is encrypted differently, the switch 704 decrypts the data at each outgoing port 705-707 according to the key for the domain 306-308 corresponding to that outgoing port 705-707. Thus, if the packet is proper (e.g., the packet is not addressed from one domain 306-308 into another 306-308), the packet will be properly decrypted because it will be forwarded by the switch 704 to the outgoing encrypting port 705-707 corresponding to the domain 306-308 of the packet. That outgoing port 705-707 decrypts packets with a key corresponding to the domain 306-308 of the outgoing port 705-707, so the packet will be decrypted with a key that corresponds to its encryption key, which was also domain specific. Similarly, for packets incoming at an encrypting port 705-707, the switch 704 encrypts each packet corresponding to the encryption/decryption key for the single domain 306-308 that that encrypting port 705-707 is at the boundary of.

Multiple encrypting ports as well as multiple non-encrypting ports of the switch 704 in which packets are forwarded between can be within a common LAN. In this example, the first through fifth ports 705-709 are all in a common LAN. In an example, however, the switch 704 can implement multiple VLANs while the switch 704 also performs crypto-partitioning. Each of the multiple VLANs can operate a distinct implementation of crypto-partitioning as described herein.

The client node 102 (i.e., the respective guest OS/VM/container/application) similarly encrypts/decrypts data differently for each domain 306-308, and maintains distinct encryption/decryption keys for each domain 306-308 in which the client node 102 operates in. Thus, packets in a first domain 306 (i.e., from/to an application/partition 310-1 in a first domain) are encrypted/decrypted with first encryption/decryption keys and packets in a second domain 307 (i.e., from/to an application/partition 310-2 in a second domain) are encrypted/decrypted with second encryption/decryption keys. As mentioned above, each respective guest OS/VM/container/application can perform the encryption/decryption for its packets. The following will refer solely to the guest OS performing the encryption/decryption, however, it should be understood that the encryption could be performed by the VM/container/application itself.

For packets to/from a first application running on a first guest OS in a first partition 310-1 on the client node 102, the first guest OS encrypts/decrypts the packets with first encryption/decryption keys corresponding to the domain 306 of the first partition 310-1. For packets to/from a second application running on a second guest OS in a second partition 310-2 on the client node 102, the second guest OS encrypts/decrypts the packets with encryption/decryption keys corresponding to the domain 307 of the second partition. If, as in the example shown in FIG. 7, the second partition 310-2 is in a different domain 307 than the first partition 310-1, the encryption/decryption keys used by the second guest OS correspond to the second domain 307 and, therefore, are different than the encryption/decryption keys used by the first guest OS. If, however, in an alternative example the second partition 310-2 is in a common domain with the first partition 310-1, the second guest OS can use common encryption/decryption keys (corresponding to the common domain) with the first guest OS. In this way, the client node 102 can encrypt/decrypt packets for different domains differently.

The cloud manager 110 can control which domain(s) are implemented over the PCM 701 by controlling the client node 102 and the switch 704. The cloud manager 108 can control the client node 102 via its communications with the client manager 110. In addition to controlling which applications are running on the client node 102, the cloud manager 108 can control which domains on the client node 102 have access to the PCM 701. The cloud manager 108 can instruct the client manager 110 of the client node 102 to couple one or more of the domains 306-308 to the physical network interface for the PCM 701. In response to the instruction, the client manager 110 can assign virtual bridges to the applications operating in these one or more domains 306-308 to the physical address of the network interface for the PCM 701. The client manager 110 can restrict access to the network interface for the PCM 701 for any applications that are not operating in the one or more domains 306-308.

The cloud manager 108 can control the switch 704 via control messages (e.g., layer-2 or layer-3 messages). The communication with the switch 704 and the client node 102 can coordinate the encryption keys to be used for a domain 306-308. The encryption/decryption keys of each encrypting port 705-707 are coordinated so that the encryption/decryption keys of each encrypting port 705-707 correspond to the encryption/decryption keys used by the client node 102 for the corresponding domain 306-308. For packets in a first domain 306, the encryption/decryption keys used by the client node 102 for those packets correspond to the encryption/decryption keys used by any encryption ports 705 of the switch 704 that are at a boundary of the common domain area and the first domain 306. When the encryption/decryption keys correspond in this way between the client node 102 and the switch 704, packets sent by the client node 102 and forwarded to the proper encrypting port 705-707 of the switch 704 are decrypted by the switch 704, and incoming packets forwarded from an encrypting port 705-707 of the switch 704 toward the client node 102 can be decrypted when received by the client node 102. In examples where the encryption is done according to the IPsec protocol, the coordination between the switch 704 and the client node 102 is also done according to the IPsec protocol. In an example, the client manager 110 is implemented as a separation kernel and distributes the keys among the different domains implemented on the client node 102. In an alternative example, where the client node 102 runs a secure OS as its host OS, a user-level application on the host OS of the client node 102 can distribute the keys among the different domains on the client node 102. In such an alternative example, the host OS can guarantee separation of process memory to reduce the risk of key theft by applications in different domains. The host OS can also protect IPsec configuration from manipulation by any process other than a management process (e.g., the client manager 110 or key distribution process).

The switch 704 and client manager 110 can encrypt/decrypt packets to/from the cloud manager 108 in the cloud management domain 309 in the same manner as the packets sent to/from the client node 102 and switch 704 to each data domain 306-308. Accordingly, the client manager 110 and switch 704 can use different encryption/decryption keys for cloud manager communications than used for any of the domains 306-308. Thus, cloud manager communications can be maintained separate from the domain data with encryption in the common domain area. Since cloud manager communications are handled by the client manager 110 (implemented as a host OS) of the client node 102, the cloud manager communications are encrypted/decrypted by the client manager 110. The host OS can be a trusted OS that ensures that communications between that client node 102 and the cloud manager 108 do not have access to the guest OSes. The host OS can also ensure that access to packet metadata, like layer-2 headers, is restricted to reduce spoofing or other attacks.

If a rogue application on the client node 102 on a first domain 306 attempts to send or receive a packet to/from a second domain 307, the packet will not be properly decrypted by the switch 704 at the outgoing port 706 or the client node 102 for an incoming packet, because the decryption keys used will correspond to a different domain than the encryption key used on the packet. Thus, the encryption restricts access for an application/node to data outside of its domain 306-308. In this way, encryption can be used to maintain separation of the domains 306-308 while the data from multiple domains concurrently traverses common network elements (e.g., PCMs, network devices). Unencrypted or improperly encrypted packets maybe ignored when received.

The domains 306-308 implemented by a multi-domain crypto-partitioning client node 102 can be changed in order to run a different set of applications of different domains 306-308 on the client node 102 at different times. The domains 306-308 implemented by the switch 704 are changed correspondingly to allow proper crypto-partitioned packets in the common area of network 100. The cloud manager 108 can control which domains 306-308 are implemented by the client node 102 and the switch 704 based on the applications assigned to run on the client node 102. In particular, the cloud manager 108 instructs the switch domains of the hardware ports of the switch 704 in order to implement the application-client node assignments determined based on the utility function as discussed above.

The cloud manager can maintain a list of the domain(s) being implemented by the client node 102 and the switch 704 and control them based on the applications assigned to run on the client node 102. In particular, the cloud manager 108 controls which jacks of the switch 604 are to be set up with encrypting ports 705-708 and which jacks are to be set up with non-encrypting ports 709 based on the make-up of the network 100 and the application-client node assignments determined according to the utility function. For example, if the cloud manager 108 determines that client node 102 is to implement multiple domains 306-308 such that PCM 701 and switch 704 are in a common domain area (as shown in the example of FIG. 7) the cloud manager 108 can instruct switch 704 to use a port for the jack of PCM 701 that is a non-encrypting port 709 and to use encrypting ports 705-707 for the single domain network links 101-7, 101-8, 101-9. Moreover, the cloud manager 108 can instruct the switch 705-707 regarding which keys to use for each encrypting port 705-708. The cloud manager 108 can instruct the switch 704 and client node 102 regarding the encryption/decryption keys by providing information regarding the encryption/decryption keys to use for each encrypting port 705-707. The encrypting/decrypting information can be the keys themselves or can be information identifying to the switch 704 and client node 102 respectively, which entity (e.g., client manager 110, guest OS) of the client node 102 is to correspond to the same domain as which port of the switch 704. In some examples, multiple encryption/decryption key pairs can be used per domain, while still ensuring that distinct domains use distinct encryption/decryption keys.

Ports that are not on a boundary of the common domain area are set up as non-encrypting ports. As mentioned above, whether a port is an encrypting port or a non-encrypting port and the domain corresponding to an encrypting port, can be changed over time to account for changes in the application-client node assignments by the cloud manager 108. The cloud manager 108 can also ensure that a client node 102 has erased all keys for a domain if that client node 102 will not have any active applications on the client node 102 for a period of time. This can be used as another fail-safe to ensure that the keys for a domain are not accessed by an application in a first domain that is allocated hardware resources previously used by an application in another domain.

The client node 102 can also switch between operating as a crypto-partitioned client node and operating as a single domain client node according to the domain of the applications assigned to the client node 102. If during a first time period applications in multiple domains are assigned to the client node 102, the client node 102 operates as a crypto-partitioned client node during this first time period. If during a second time period all the one or more applications assigned to the client node are in a single domain, the client node can operate as a single domain client node during this second time period. Notably, when operating as a single domain client node encryption/decryption of the packets from the application(s) of the client node 102 may not be needed unless it is still desired for maintaining separation of the domain data from the cloud management communications. Eliminating the encryption/decryption in such a situation would reduce the overhead to sending/receiving the packets. The switch 704 would coordinate with the client node 102 as it switches to or from a crypto-partitioned node.

Also, although a single PCM 701 is coupled to the client node 102 in the example of FIG. 7, in other examples, multiple PCMs 701 can be coupled to the client node 102. The packets sent and received over each of the multiple network links can be encrypted to implement crypto-partitioning as described herein.

Although only a single multi-domain client node 102 is shown in FIG. 7, there can be multiple multi-domain client nodes 102 connected to distinct PCMs which are connected to the switch 704 simultaneously. Moreover, a mix of single domain client nodes (FIG. 3), multi-domain client nodes (FIG. 5), sequential multi-domain-per-PCM client nodes (FIG. 6), and/or crypto-partitioned client nodes (FIG. 7) can be coupled to one or more switches (e.g., 704) and simultaneously controlled by a single could manager 108.

In other examples, the communications between the client node 102 and the cloud manager 108 can occur over a network link that is distinct from the PCM 701. In such an example, communications between the client node 102 and the cloud manager 108 may not be encrypted if separation of the cloud manager communications from the domain communications is achieved by the physical isolation of the respective communications. The cloud manager 108 communications on the distinct network link could also occur over a distinct VLAN from the domain communications for the client node 102.

From the point of view of the partitions 310-1, 310-2, 310-3 or applications on a client node 102, there is little or no difference between the crypto-partitioned domain separation discussed with respect to FIG. 6 and the sequential multi-domain-per-PCM separation discussed with respect to FIG. 7 if the encryption is implemented with the client manager 110. Advantageously, crypto-partitioned domain separation can be implemented without hardware customization to many client nodes 102. For example, a client node 102 with a single network interface may be implemented as a multi-domain client node or as a single domain client node with separated cloud management communications, without requiring addition of more network interfaces. In an example, multiple crypto-partitioned switches 704 can be trunked together or a crypto-partitioned switch 704 can be trunked together with a dynamically partitioned switch 604 or a VLAN switch. In examples where multiple crypto-partitioned switches are trunked together, data from multiple domains can be sent over a single trunk link by including the single trunk line in the common domain area and encrypting the domain data sent over the trunk line.

For client nodes 102 that can implement multiple domains, the cloud manager 108 can prioritize application assignments that enable a client node 102 that is allowed to operate in multiple domains operates only in a single domain. Operating a client node 102 in a single domain may improve efficiency by reducing the acts necessary to effectuate the multiple domains at the client node 102. The acts reduced include the coordination and switching of a sequential multi-domain-per-PCM client node 102 and dynamically partitioned network switch 604 from using a first domain over a PCM 601 to a second domain and the coordination and encryption/decryption used to communicate multiple domains over a PCM 701 in the crypto-partitioned isolation of FIG. 7. Another benefit of operating a client node 102 in a single domain at a time is that a client node 102 operating in a single domain may be able to employ a secure OS certified to a lower level than a separation kernel or similar high-security solutions without risking data leakage. Yet another benefit is that by operating a client node 102 in a single domain, separation of domains is provided by physical separation, which may be most secure separation.

To enable a client node 102 that is allowed to operate in multiple domains to operate in a single domain, all applications assigned by the cloud manager 108 to the client node 102 are allowed to operate in a common domain, such that the client node 102 can operate in that common domain. In examples where a utility function is used to balance multiple competing factors, the prioritization of operating a client node 102 in a single domain can be an optional factor in the utility function.

A variation of this is that the cloud manager 108 can attempt to prioritize application assignments that have fewer domains implemented on a given client node 102. This leaves more network interfaces unassigned in the cloud as a whole, leaving more availability for domain assignments in the future.

As mentioned above, the cloud manager 108 can manage a network of client nodes 102 in which the client nodes 102 are a mix of any of the client nodes 102 discussed herein. Supporting all different domain separation types (FIGS. 3, 5, 6, and 7) provides a cloud environment in which the network connectivity of client node 102 can be optimized to match the client node 102 capabilities. For instance, a client node 102 with a single network interface can be connected to multiple security domains via a sequential-multi-domain-per-PCM or crypt-partitioned configuration. A client node 102 that is not capable or running on approved secure host OS for the client manager 110 can be isolated using physical separation and limited to a single security domain. A client node 102 lacking the compute power to handle the overhead of encrypting/decrypting communication or a client node 102 consuming data for which the latency of encryption or for which the data rate makes encryption undesirable can multi-domain of FIG. 5.

The cloud manager 108 can manage such a network dynamically, adjusting the application(s) assigned to each client node 102 over time. This dynamic adjustment can include adjusting which domains the client nodes 102 operate in and adjusting the configuration of a dynamically partitioned network switch 604 and/or crypto-partitioned network switch 704 accordingly.

In an example, the dynamic adjustment can be performed in response to an input to the cloud manager 108 from an administrator or other entity requesting a change in the network 100 and/or a change to the active applications. For example, initially an administrator or other entity can submit a request to the cloud manager 108 that a list of applications be activated on the client nodes 102. In response to the request to activate the applications, the cloud manager 108 can then use the client node 102 profiles and the profiles of the applications on the list with the utility function to determine and communicate out a client node 102 assignment for each of the applications on the list. At a later time, the administrator or other entity can submit a request to add and/or remove one or more applications to the list of active applications. In response to this request, the cloud manager 108 can re-run the utility function with the updated list of active applications and change any necessary assignments to effectuate the updated assignments indicated by the results of the utility function. The same processes can be used if an administrator or other entity submits a request to add or remove a client node 102 or networking device to the network 100.

In another example, the dynamic adjustment can be performed in response to a sensed change in the network by the cloud manager 108. For example, while one or more applications are active on the client nodes 102, the cloud manager 108 can sense a change in the one or more applications and/or the network 100 and can adjust the application assignments and device configurations in response thereto. The cloud manager 108 can communicate with the client nodes 102 to identify changes in the one or more applications. In particular, the one or more applications can send information to the cloud manager 108 via the client managers 110 of each client node 102. This information can include information regarding such as the requested hardware resources of an application, a stage completed by an application, and/or a completion of processing by the application. In response to receiving this information, the client manager 108 can re-run the utility function with the updated information and change any necessary assignments to effectuate the updated assignments indicated by the results of the utility function. The cloud manager 108 can sense changes in the network 100 by communication with the client nodes 102 and the networking devices. Via this communication, the cloud manager 108 can identify a client node 102 leaving or joining the network 100, a client node 102 malfunctioning, or a networking device connecting to or disconnecting from the network 100, among other things. In response to identifying such a change, the cloud manger 108 can update the application assignments as discussed above.

Referring now to FIG. 8, in yet another example, the cloud manager 108 follows a plan 800 to control which of a plurality of applications 802 run on which client node 102 at which time. The plan 800 is a preconfigured schedule that indicates when to activate and/or halt each of the plurality of applications 802 being managed by the cloud manager 108. The plan 800 is based on information provided by an administrator or other entity, typically prior to initiation of management session. As used herein, a management session is a time period from the start of managing the plurality of applications 802 by following the plan 800 until an end of the plan is reached and the plurality of applications are no longer managed (e.g., all are halted) by the cloud manager 108.

Following the plan 800 allows the cloud manager 108 to operate autonomously for all or a portion of the management session. That is, by following the plan 800, the cloud manager 108 can activate and/or halt respective applications of the plurality of applications 802 on respective client nodes 102 without further administrator instruction. The plan 800 includes one or more trigger events 804 tied to action(s) 806 the cloud manager 108 is to perform. A trigger event 804 is an event that can be observed by the cloud manager 108. An action 806 in the plan 800 can include adding and/or removing an application 802 from a list of authorized applications. The list of authorized applications is the list of all applications that are currently authorized to run on the client nodes 102. The plan 800 instructs the cloud manager 108 to add and/or remove an application 302 from the list of authorized applications.

The cloud manager 108 evaluates the list of authorized applications and the plurality of client nodes 102 to determine which of the authorized applications to run on which of the plurality of client nodes 102. In particular, the could manager 108 uses the utility function to evaluate the list of authorized applications and the plurality of client nodes 102. As discussed above, the utility function factors in aspects of each of the one or more authorized applications as well as the plurality of client nodes, including the domain aspects of the applications and client nodes, to provide a metric to measure the utility of a given implementation of applications on the client nodes 102. The cloud manager 108 can maximize the utility function to determine which of the one or more authorized applications to run on which of the plurality of client nodes 102. More detail regarding a plan that can be implemented by cloud manager 108 is provided in co-pending U.S. patent application Ser. No. 15/583,692, titled "PLANNED CLOUD RESOURCE MANAGEMENT", filed on even date herewith, and which is hereby incorporated herein by reference.

The instructions 208 on each client node 102 include the client manager 110 for managing one or more applications running on the client node 102. In a first example, the software code necessary to implement a first application can be stored on the one or more data storage mediums 206 of the client node 102, e.g., by an administrator, prior to initiation of the cloud management session. Such pre-loaded software code is referred to herein as "pre-loaded" software code. In such a first example, the first application can be activated by sending an instruction from the cloud manager 108, receiving the instruction at the client manager 110 of the client node 102, and the client manager 110 initiating execution of the pre-loaded software code on the one or more data storage mediums 206.

In an alternative example, the software code for the first application can be absent from the client node 102 upon initiation of the cloud management session and the software code can be sent to the client node 102 by the cloud manager 108 during execution of the cloud management session and prior to activation of the first application on the client node 102. Software code in such an alternative non-pre-loaded example is referred to herein as "on-demand loaded" software code. On-demand loaded software code an initially be stored on cloud manager node 106, on another client node 102 (e.g., a client node 102 with abundant data storage capacity), or on a device outside of the network 100. The cloud manager 108 can, e.g., upon determining that the first application is to be run on the client node 102, take the appropriate action to send the software code to the client node 102. The appropriate action can include sending the software code itself from the cloud manager node 106 to the client node 102, instructing another client node 102 storing the software code to send the software code to the client node 102, or sending an appropriate message to an entity outside the network 100 to enable the entity to send the software code to the client node 102. The applications run on a client node 102 can be any mix of pre-loaded software code and on-demand software code including all pre-loaded or all on-demand software code.

In a first example, the cloud manager 108 is a program deployed in a virtual machine (VM) or container (e.g., Linux container (LXC)) that can have one or more duplicates stored on distinct client nodes to provide fault tolerance for the cloud manager 108. With such a duplicate, a backup cloud manager 108 could be started if the master fails.

In a second example, live cloud manager 108 backups in VMs or containers are assigned unique IP addresses and each access a single shared database for application profiles and a single shared database for client node profiles. These database can be backed-up to provide fault tolerance. A live backup instance of a cloud manager 108 can be controlled so that its virtual machine or container does not bridge its IP address to the physical network address unless the backup becomes the master. Thus, the live backup instance of the cloud manager 108 can keep up-to-date with the master instance.

In a third example, the cloud manager 108 can be distributed across multiple client nodes. Multiple co-equal cloud management services can collaborate to make application-node assignment decisions and keep databases synchronized. Control messages from the cloud manager 108 can be sent from a single instance with notification sent to other instances. An election mechanism can be used by all live instances to select a designated leader to decide application-node assignments and communicate with necessary services. Alternatively, leaderless collaboration can be used with messages sent from any instances, wherein the instances are predictable and synchronized.

By keeping the cloud management system focused as described herein, the developed software and its library dependencies is reduced, making the cloud management system easier to port to unique platforms. Also, the reduced code size may aid in the cloud management system being certifiable for safety and/or security.

Figure 9:
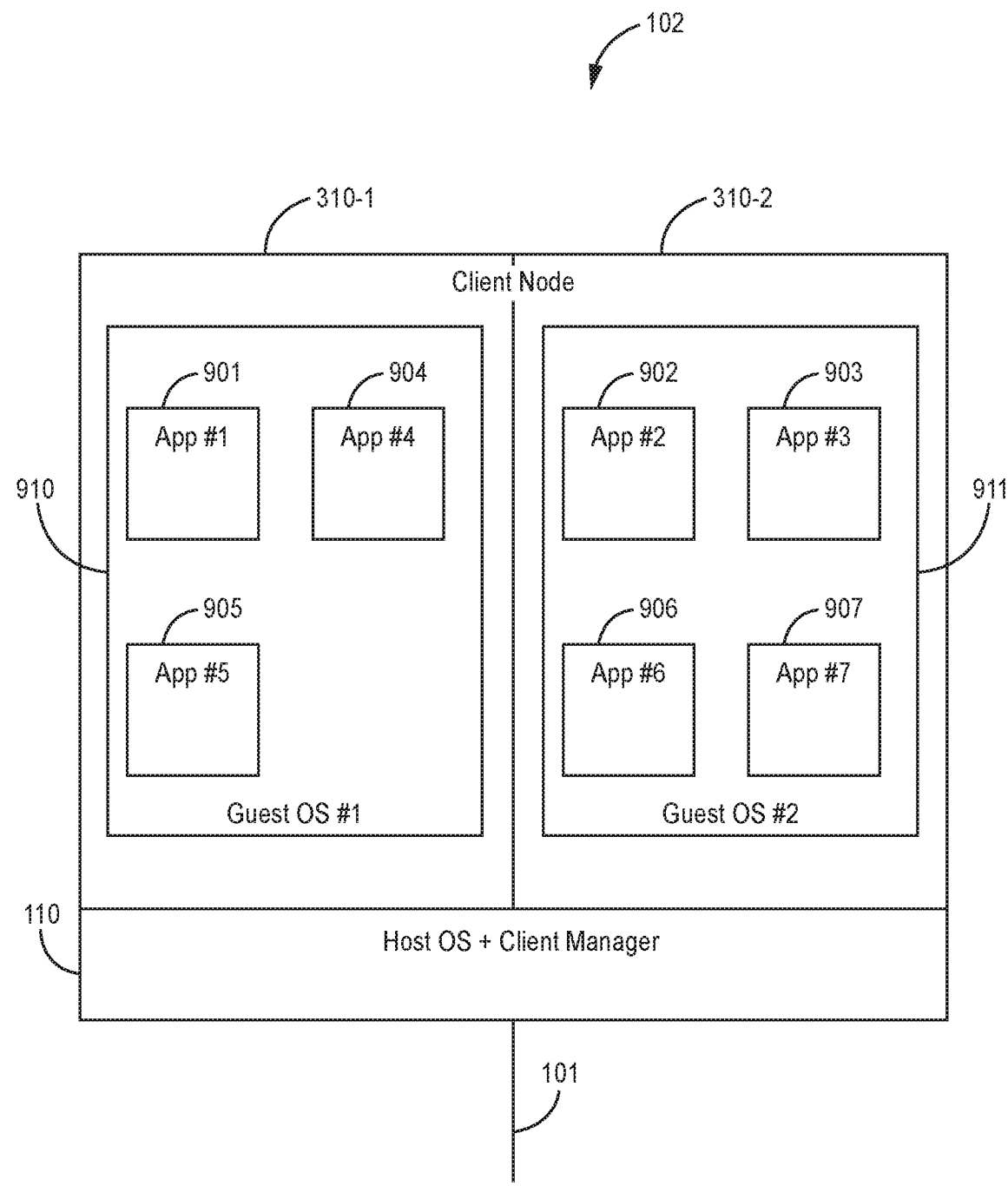
FIG. 9 is a block diagram of an example multi-domain client node of FIGS. 5, 6, and 7.

FIG. 9 is a block diagram of an example multi-domain client node 102 that can be a multi-domain client node as discussed with respect to FIG. 6 or FIG. 7. The client node 102 includes a client manager 110 that implements multiple partitions 310-1, 310-2 thereon in order to implement multiple domains. In this example, the client manager 110 implements a first domain in a first partition 310-1 and a second domain in a second partition 310-2. The client manager 110 implements a single domain in each partition 310-1, 310-2 in order to maintain separation of the domains.

As mentioned above, the client manager 110 can execute on a hypervisor that creates each partition 310-1, 310-2, and one or more applications can be executed in each partition 310-1, 310-2. Using a hypervisor for virtualizes the hardware of the client node 102, so that the applications 901-907 in each partition 310-1, 310-2 can run on the virtualized hardware, which aids in restricting access of the applications 901, 904, 905 in one domain to the applications/data 902, 903, 906, 907 in other domains even though the applications in both domains will be running on the same hardware. In an example, the hypervisor implementing the client manager 110 is one of Linux containers (LXC) (e.g., an unprivileged container), kernel-based virtual machine (KVM), a separation kernel protection profile (SKPP), seL4, or XEN. In an example, the hypervisor can provide EAL6 or higher virtualization.

Within each partition 310-1, 310-2, a guest OS 910, 911 is run as mentioned above. Each partition 310-1, 310-2 runs a distinct instance of a guest OS 910, 911. The distinct instances of the guest OSes 910, 911 can be the same type of guest OS (e.g., LXC). The one or more applications 901, 904, 905 that are run in a partition 310-1 are run on the guest OS 910 running in the partition 310-1. That is, multiple applications 901, 904, 905 can be run on a single guest OS 910 in a partition 310-1. In an example, all of the applications 901, 904, 905 in a partition 310-1 can be run on a single guest OS 910. Since the cloud manager 108 and client manager 110 have assured that all applications 901, 904, 905 assigned to a single partition 310-1 are allowed to operate in the domain of the partition 310-1, the client node 102 can run multiple applications 901, 904, 905 in a single guest OS 910, because there is no risk of cross-domain contact between the applications 901, 904, 905 when they are all operating in a common domain. Advantageously, running multiple applications 901, 904, 905 in a single guest OS 901 allows the multiple applications 901, 904, 905 to efficiently share the virtualized hardware resources available to the guest OS 910, because the guest OS 910 can directly manage the sharing of the resources. Although the discussion of a single partition and its guest OS and applications above references only the first partition 310-1 and corresponding guest OS 910 and applications 901, 904, 905, it should be understood that the discussion can apply to all partitions 310-1, 310-2 and corresponding guest OSes 910, 911 and applications 901-907.

In an example, each application 901-907 is a user-level process operating on its respective guest OS 910, 911. In another example, the guest OS 910, 911 can implement a light-weight operating system level virtualization and each of the multiple applications 901-907 running on that guest OS 910, 911 can be run in a distinct virtual machine or container. Example guest OSs 910, 911 that can be used include Linux containers (LXC) (e.g., an unprivileged container), VxWorks, Linux, Android, and JVM. Accordingly, the client node 102 implements a two-layer solution to partitioning that provides a secure separation between applications operating in different domains, while allowing efficient sharing of hardware resources among applications operating in a common domain.

As should be understood, each partition 310-1, 310-2 can have a guest OS 910, 911 on which multiple applications 901-907 can run. In some examples, multiple guest OSs can be run in a given partition 310-1, 310-2, and each such guest OS in a partition 310-1, 310-2 can run one or more applications 901-907. Moreover, although the example client node 102 discussed with respect to FIG. 9 includes two partitions 310, the client node 102 can include one or more than two partitions 310, each partition 310 with a respective guest OS and applications as described above.

Figure 10:
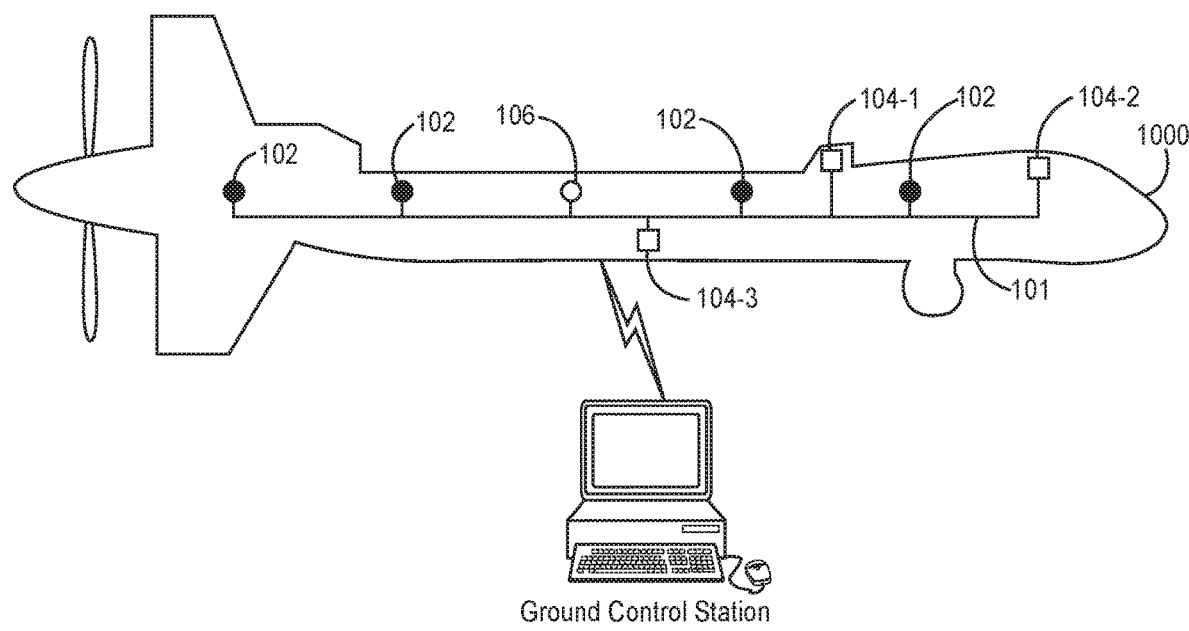
FIG. 10 is a block diagram of an example vehicle having the network of FIG. 1 therein.

FIG. 10 is a block diagram of an example vehicle 1000 having a network 100 therein. Vehicle 1000 is an unmanned aerial vehicle (UAV) performing surveillance over an area of interest. In this example, the non-client nodes 104 of vehicle 1000 include a first non-client node 104-1 operating in a first domain, a second non-client node 104-2 operating in a second domain, and a third non-client node 104-3 operating in a third domain. In this example, each of the non-client nodes 104 is a respective sensor sensing information regarding the real-world environment around the vehicle and outputting data corresponding thereto into the network 100. The cloud manager 108 in the cloud manager node 106 assigns a plurality of applications to the plurality of client nodes 102 to perform various tasks based on data from the first, second, and third non-client nodes 104-1, 104-2, 104-3 respectively. The cloud manager 108 assigns the applications and controls the client nodes 102 and networking devices (not shown) to ensure separation of the domains by ensuring that the data from each non-client node 104-1, 104-2, 104-3 remains isolated from applications operating on data from another of the non-client nodes 104-1, 104-2, 104-3. The network 100 and cloud manager 108 can use any one or more of the isolation approaches discussed above with respect to FIGS. 3, 5, 6, and 7 to maintain separation of the domains. For simplicity, single lines are shown connecting the nodes 102, 104, 106 together, however, one or more distinct network links 101 communicatively coupling each of the nodes 102, 104, 106 to a networking device or another node can be used as described in the example portions 300, 500, 600, and 700 of network 100 herein.

Other example vehicles in which the network 100 can be implemented include an aircraft (e.g., airplane, jet, drone (UAS), a land vehicle (e.g., automobile, semi-truck, construction equipment, motorcycle, ATV, snowmobile, remote controlled car), a watercraft (e.g., boat, ship, submarine), or a spacecraft (e.g., transport rocket, satellite).

Figure 11:
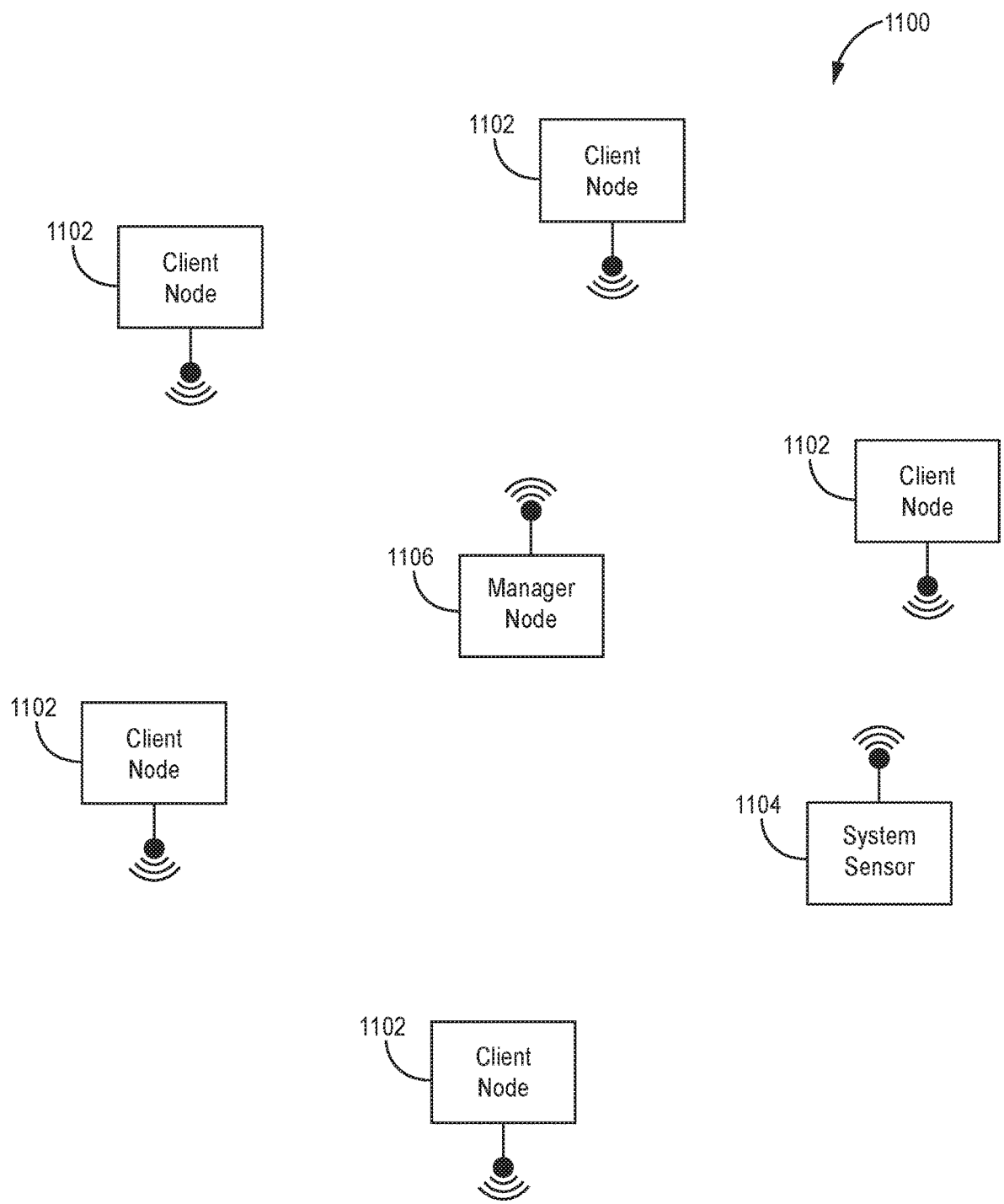
FIG. 11 is a block diagram of another example network including a plurality of nodes that can implement multi-domain cloud computing.

FIG. 11 is a block diagram of another example network 1100 implementing the multi-domain cloud management described herein. Network 1100 is similar to network 100, except one or more of the nodes 1102, 1104, 1106 of network 1100 are mobile. In the example network 1100, all of the nodes 1102, 1104, 1106 are mobile. That is, each node 1102, 1104, 1106 can move independently of the other nodes 1102, 1104, 1106. The plurality of nodes 102, 104, 106 are communicatively coupled together via one or more network links 101.

The plurality of individually mobile nodes 1102, 1104, 1106 are communicatively coupled together over wireless links to form the cloud network 1100. Examples of such a plurality of individually mobile nodes includes a plurality of UAVs, or a plurality of personal mobile devices (e.g., phones) in an ad-hoc network. In an example, the plurality of individually mobile nodes can be communicatively coupled together in accordance with a wireless LAN (WLAN) protocol (e.g., IEEE 802.11s). Advantageously, the cloud manager 108 in such a wireless cloud network can account for nodes joining or leaving the network as it assigns applications to the plurality of mobile nodes. The network 1100 can implement the planed cloud resource management described herein to dynamically assign applications to respective client nodes 102, among other actions.

Client nodes 1102 can be the same as client nodes 102 discussed above, except that they are mobile. Accordingly, client node 1102 are controlled by a cloud manager 1108 to execute a plurality of applications on the client nodes 1102. The cloud manager 1108 can also be identical to the cloud manager 108 discussed above, except the cloud manager 1108 is implemented on one or more mobile nodes. In this example, the cloud manager 108 runs on a separate cloud manager node 1106. Network 1100 can also include one or more mobile or stationary non-client nodes 104.

An example cloud management system as described herein is the Cloud-Based Efficient Data Analysis and Reduction (CEDAR) system described in U.S. Provisional Patent Application No. 62/329,429, which is hereby incorporated herein by reference.

What is claimed is:

1. A method of managing a plurality of client nodes in a network, the method comprising:
   providing a plurality of domains in the network, each domain isolating data from other domains;
   providing a plurality of applications, each application of the plurality of applications having a profile that indicates which one or more domains of the plurality of domains the application is allowed to operate in;
   wherein each of the plurality of client nodes has a profile that indicates which one or more of the plurality of domains that client node is allowed to operate in;
   evaluating different assignments of the plurality of applications to select an assignment that assigns the plurality of applications to the plurality of client nodes such that each application of the plurality of applications is assigned to a client node that is allowed to operate in a domain that the application is allowed to operate in,
   wherein evaluating different assignments includes:
      generate a plurality of assignments, each assignment of the plurality of assignments assigning each of the plurality of applications to one or more of the plurality of client nodes, wherein the assignments are developed based on the profile of each of the plurality of applications and the profile of each of the plurality of client nodes such that each of the plurality of applications is assigned to a client node that is allowed to operate in the domain that the application is allowed to operate in; and
comparing the plurality of assignments to one another with a utility function that factors in multiple aspects in addition to the domains of the applications and the client nodes.

2. The method of claim 1, wherein each client node of the plurality of client nodes implements either a single one of the plurality of domains or implements multiple domains of the plurality of domains by maintaining a plurality of partitions on the client node and executing applications for each domain of the multiple domains in a disjoint subset of the plurality of partitions from other of the multiple domains.

3. The method of claim 2, wherein at least one client node of the plurality of client nodes implements multiple domains by executing a host operating system that maintains the plurality of partitions, and executing a respective guest operating system in each of the plurality of partitions.

4. The method of claim 3, comprising:
executing multiple applications on a first guest operating system of the respective guest operating systems, each of the multiple applications operating in a common domain corresponding to the domain of a partition in which the first guest operating system is executing.

5. The method of claim 2, comprising:
executing a secure hypervisor separation kernel at at least one of the client nodes implementing multiple domains, the separation kernel maintaining separation of each partition of the multiple partitions from other partitions of the multiple partitions.

6. The method of claim 2, comprising:
sharing a physical communication medium communicatively coupling a first client node to a networking device amongst multiple domains by controlling which of the plurality of partitions are bridged to a physical network interface of the first client node, wherein the physical communication medium is connected to the physical network interface.

7. The method of claim 6, wherein sharing includes bridging one or more partitions corresponding to each domain to the physical network interface sequentially.

8. The method of claim 2, providing a networking device communicatively coupled to a first client node via a first physical communication medium,
the first client node encrypting/decrypting packets for a first domain using first encryption/decryption keys, and encrypting/decrypting packets for a second domain using second encryption/decryption keys, wherein the first client node sends the packets for the first domain and the second domain over the first physical communication medium,
the networking device receiving the packets and forwarding the packets to a respective outgoing port as addressed by the respective packet;
for each port that is at a boundary between a single domain and a multi-domain area of the first physical communication medium, the networking device encrypting and decrypting the packets such that the packets in the single domain area are unencrypted and packets in the multi-domain area are encrypted.

9. The method of claim 1, wherein each domain of the plurality of domains is a distinct one or more local area networks from other domains of the plurality of domains.

10. The method of claim 1, comprising:
separating communications with a cloud manager from communications in the plurality of domains, wherein the cloud manager communicates with the plurality of client nodes to assign the plurality of applications thereto.

11. A network of nodes comprising:
a plurality of client nodes; and
one or more networking devices;
wherein the plurality of client nodes and networking devices implement multiple domains, each domain of the multiple domains isolating data from other domains of the multiple domains,
wherein a cloud manager evaluates different assignments of the plurality of applications to select an assignment and instruct the plurality of client nodes to run a plurality of applications, such that an allowed domain for each of the plurality of applications matches with an allowed domain of a client node on which the application is run, each application of the plurality of applications having a profile that indicates which one or more domains of the plurality of domains is an allowed domain for the application, and each client node of the plurality of client nodes having a profile that indicates which one or more of the plurality of domains is an allowed domain for that client node;
wherein evaluates different assignments includes:
generate a plurality of assignments; each assignment of the plurality of assignments assigning each of the plurality of applications to one or more of the plurality of client nodes, wherein the assignments are developed based on the profile of each of the plurality of applications and the profile of each of the plurality of client nodes such that each of the plurality of applications is assigned to a client node that is allowed to operate in the domain that the application is allowed to operate in; and
compare the plurality of assignments to one another with a utility function that factors in multiple aspects in addition to the domains of the applications and the client nodes.

12. The network of claim 11, wherein a first subset of the plurality of client nodes operate in a single domain of the multiple domains, wherein a second subset of the plurality of client nodes operate in at least two of the multiple domains.

13. The network of claim 11, wherein at the cloud manager controls which of the multiple domains a first client node of the client nodes in the second subset operates in.

14. The network of claim 13, wherein the cloud manager controls a first networking device communicatively coupled to the first client node over at least a first network link, such that the first networking device implements a common domain with the first client node over the first network link.

15. The network of claim 11, wherein the cloud manager instructs a second client node of the plurality of client nodes to change from operating in a first domain to operating in a second domain,
wherein the cloud manager instructs a second networking device that is communicatively, coupled to the second client node over a second network link, to change from implementing the first domain over the second network link to implementing the second domain over the second network link.

16. The network of claim 15, wherein the cloud manager instructs the second networking device to change includes the cloud manager instructs the second networking device to change an assignment of a physical network interface to which the second network link is connected, from a first VLAN to a second VLAN.

17. The network of claim 15, wherein the cloud manager instructs the second client node to change includes the cloud manager instructs the second client node to encrypt communications from the second domain with a first encryption key;
wherein the cloud manager instructs the second networking device to change includes the cloud manager instructs the second networking device to use a decryption key corresponding to the first encryption key for communications from the second client node that are leaving the second networking device to a single domain area of the second domain.

18. A data storage entity comprising:
a non-transitory processor readable medium having software stored thereon, wherein the software, when executed by one or more processing devices:
evaluates different assignments of a plurality of applications to a plurality of client nodes to select an assignment that assigns each application of the plurality of applications to a client node that is allowed to operate in a domain that the application is allowed to operate in,
wherein each domain of the plurality of domains is a distinct one or more local area networks, wherein each domain isolates data from other domains;
wherein each application of the plurality of applications has a profile that indicates which one or more domains of the plurality of domains the application is allowed to operate in;
wherein each of the plurality of client nodes has a profile that indicates which one or more of the plurality of domains that client node is allowed to operate in;
wherein evaluates different assignments includes:
generate a plurality of assignments, each assignment of the plurality of assignments assigning each of the plurality of applications to one or more of the plurality of client nodes, wherein the assignments are developed based on the profile of each of the plurality of applications and the profile of each of the plurality of client nodes such that each of the plurality of applications is assigned to a client node that is allowed to operate in the domain that the application is allowed to operate in; and
compare the plurality of assignments to one another with a utility function that factors in multiple aspects in addition to the domains of the applications and the client nodes.

19. The data storage entity of claim 18, wherein each client node of the plurality of client nodes implements either a single one of the plurality of domains or implements multiple domains of the plurality of domains by maintaining a plurality of partitions on the client node and executing applications for each domain of the multiple domains in a disjoint subset of the plurality of partitions from other of the multiple domains.

20. The data storage entity of claim 18, wherein at least one client node of the plurality of client nodes implements multiple domains by executing a separation kernel operating system that maintains the plurality of partitions, and executing a respective guest operating system in each of the plurality of partitions,
wherein multiple applications on a first guest operating system of the respective guest operating systems, each of the multiple applications operating in a common domain corresponding to the domain of a partition in which the first guest operating system is executing.

* * * * *